US012646319B2

(12) United States Patent
Latapie et al.

(10) Patent No.: US 12,646,319 B2
(45) Date of Patent: Jun. 2, 2026

(54) AUTOMATIC LABELING AND EVENT DETECTION FOR VIDEO ANALYTICS USING HYBRID AI

(71) Applicant: Cisco Technology, Inc., San Jose, CA (US)

(72) Inventors: Hugo Latapie, Long Beach, CA (US); Enzo Fenoglio, Issy-les-Moulineaux (FR); Viktoriya V. Tsukanova, San Francisco, CA (US); Ramana Rao V. R. Kompella, Foster City, CA (US); Joost Bottenbley, Alexandria, VA (US); Chiara Troiani, Cheseaux-sur-Lausanne (CH); Ali Payani, Santa Clara, CA (US); Johanna Wylie Lanier Hardy, Cedar Park, TX (US); Jayanth Srinivasa, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 290 days.

(21) Appl. No.: 18/243,819

(22) Filed: Sep. 8, 2023

(65) Prior Publication Data
US 2025/0086971 A1　Mar. 13, 2025

(51) Int. Cl.
*G06V 20/40*　(2022.01)
*G06V 10/774*　(2022.01)

(52) U.S. Cl.
CPC ............ *G06V 20/41* (2022.01); *G06V 10/774* (2022.01)

(58) Field of Classification Search
None
See application file for complete search history.

(56) References Cited

U.S. PATENT DOCUMENTS

| | | |
|---|---|---|
| 8,195,598 B2 | 6/2012 | Hua et al. |
| 8,620,028 B2 | 12/2013 | Eaton et al. |
| 10,887,197 B2 | 1/2021 | Fenoglio et al. |

(Continued)

FOREIGN PATENT DOCUMENTS

| | | |
|---|---|---|
| WO | WO-2015027289 A1 | 3/2015 |
| WO | WO-2019168323 A1 | 9/2019 |
| WO | WO-2021251062 A1 | 12/2021 |

OTHER PUBLICATIONS

Agrawal, et al., "VQA: Visual Question Answering", Proceedings of the IEEE International Conference on Computer Vision (ICCV), 2015, 25 pages, arXiv:1505.00468v7 [cs.CL].

(Continued)

*Primary Examiner* — Leon Flores
(74) *Attorney, Agent, or Firm* — Lee & Hayes, P.C.

(57) ABSTRACT

In one implementation, a device receives a request to generate a set of video clips that depict a specified classification label. The device represents each of one or more objects depicted in a particular video clip over time as a set of timeseries of key points associated with that object. The device makes a determination as to whether the particular video clip depicts the specified classification label by analyzing the set of timeseries of key points associated with the particular video clip and in accordance with one or more constraint parameters. The device labels, based on the determination, the particular video clip with the specified classification label for inclusion in the set of video clips that depict the specified classification label.

20 Claims, 15 Drawing Sheets

(56) References Cited

U.S. PATENT DOCUMENTS

| | | | |
|---|---|---|---|
| 10,965,516 | B2 | 3/2021 | Fenoglio et al. |
| 11,336,506 | B1 | 5/2022 | Li et al. |
| 2005/0180603 | A1 | 8/2005 | Zoghlami et al. |
| 2008/0069482 | A1 | 3/2008 | Komiya |
| 2010/0322516 | A1 | 12/2010 | Xu et al. |
| 2011/0051992 | A1 | 3/2011 | Cobb et al. |
| 2012/0063641 | A1 | 3/2012 | Venkatesh et al. |
| 2013/0174116 | A1 | 7/2013 | Pfeifer |
| 2013/0191357 | A1 | 7/2013 | Hanis et al. |
| 2015/0186779 | A1 | 7/2015 | Deng et al. |
| 2016/0105617 | A1 | 4/2016 | Kirkby et al. |
| 2016/0328613 | A1 | 11/2016 | Gaidon et al. |
| 2016/0364377 | A1 | 12/2016 | Krishnamurthy |
| 2019/0325259 | A1 | 10/2019 | Murphy |
| 2019/0377824 | A1 | 12/2019 | Wang et al. |
| 2020/0251091 | A1 | 8/2020 | Zhao |
| 2020/0319715 | A1 | 10/2020 | Holz |
| 2020/0334008 | A1 | 10/2020 | Spector et al. |
| 2020/0349390 | A1 | 11/2020 | Konwar et al. |
| 2021/0042532 | A1 | 2/2021 | Latapie et al. |
| 2021/0174155 | A1 | 6/2021 | Smith et al. |
| 2021/0225409 | A1 | 7/2021 | Lawlor |
| 2021/0258652 | A1 | 8/2021 | Li et al. |
| 2021/0279615 | A1 | 9/2021 | Latapie et al. |
| 2021/0312773 | A1 | 10/2021 | Debnath et al. |
| 2021/0390423 | A1 | 12/2021 | Latapie et al. |
| 2021/0397849 | A1 | 12/2021 | Lin et al. |
| 2022/0138509 | A1 | 5/2022 | Crosby et al. |
| 2022/0156520 | A1 | 5/2022 | Brower |
| 2022/0157054 | A1 | 5/2022 | Lin et al. |
| 2022/0417590 | A1* | 12/2022 | Jiao ......................... G06V 20/52 |
| 2024/0422387 | A1* | 12/2024 | Kölhi ................. H04N 21/4667 |

OTHER PUBLICATIONS

Ahmed, et al., "Reflection Detection in Image Sequences", CVPR 2011, Jun./Jul. 2011, 9 pages, IEEE, Colorado Springs, CO.

Aleksander, Igor, "Machine consciousness" In Scholarpedia. 3(2):4162, Oct. 21, 2011, 7 pages.

Anderson, et al., "Bottom-Up and Top-Down Attention for Image Captioning and Visual Question Answering", 2018 IEEE/CVF Conference on Computer Vision and Pattern Recognition, Jun. 2018, pp. 6077-6086, IEEE, Salt Lake City, Utah.

Baudrillard, Jean, "Simulacra and Simulation", 1981, 159 pages, Galilee.

Arróspide, et al., "Homography-based ground plane detection using a single on-board camera", IET Intelligent Transport Systems 4(2), Jul. 2010, 149-160, IEEE.

Baz, et al., "Context-aware hybrid classification system for fine-grained retail product recognition", 2016 IEEE 12th Image, Video, and Multidimensional Signal Processing Workshop (IVMSP), Jul. 2016, 5 pages, IEEE, Bordeaux, France.

Blohlávek, Radim, "Concept lattices and order in fuzzy logic", Annals of Pure and Applied Logic 128 (2004) 277-298, Elsevier.

Box, G. E. P., "Science and Statistics", In Journal of the American Statistical Association, 71(356), Dec. 1976, pp. 791-799.

Chalmers, David J., "The Conscious Mind: In Search of a Fundamental Theory", 1996, 433 pages, Oxford University Press, New York.

Chella, et al., "A cognitive framework for imitation learning", Robotics and Autonomous Systems 54, Mar. 2006, pp. 403-408, Elsevier.

Chella, et al., "Artificial Consciousness", Chapter 20, In Perception-Action Cycle, 2011, pp. 637-671, Springer, New York.

Chella, et al., "Machine Consciousness: A Manifesto for Robotics", In International Journal of Machine Consciousness, 1(1), Jun. 2009, pp. 33-51, World Scientific Publishing Company.

Cohen, Paul R., "Projections as Concepts", Computer Science Department Faculty Publication Series (194), https://scholarworks.umass.edu/cs/_faculty/_pubs/194, 1997, 6 pages, University of Massachusetts, Amherst.

Cui, et al., "A survey on network embedding", IEEE Transactions on Knowledge and Data Engineering, vol. 31, Issue: 5, May 1, 2019, pp. 833-852, IEEE.

"D2.5 Profiling, Analytics and Privacy Methodological Foundations, Release II", Child Rescue, Collective Awareness Platform for Missing Children Investigation and Rescue, version 1, Jan. 2020, Horizon 2020 Programme of the European Union.

D'amour, et al., "Underspecification Presents Challenges for Credibility in Modern Machine Learning", Underspecification in Machine Learning, online: https://arxiv.org/pdf/2011.03395.pdf, Nov. 2020, 59 pages.

De Bono, Edward, "The Mechanism of Mind", 1967, 276 pages, Penguin Books.

Düntsch, et al., "Modal-style operators in qualitative data analysis", 2002 IEEE International Conference on Data Mining, 2002. Proceedings, Dec. 2002, pp. 155-162, IEEE, Maebashi City, Japan.

Franco, et al., "Grocery product detection and recognition", Expert Systems With Applications 81 (2017), pp. 163-176, Elsevier Ltd.

George, et al., "Recognizing Products: A Per-exemplar Multi-label Image Classification Approach", ECCV 2014, Part II, LNCS 8690, 2014, pp. 440-455, Springer International Publishing Switzerland.

Goertzel, et al., "CogPrime Architecture for Embodied Artificial General Intelligence", 2013 IEEE Symposium on Computational Intelligence for Human-like Intelligence (CIHLI), Apr. 2013, pp. 60-67, IEEE, Singapore.

Goertzel, Ben, "OpenCogPrime: A Cognitive Synergy Based Architecture for Artificial General Intelligence", 2009 8th IEEE International Conference on Cognitive Informatics, Jun. 2009, pp. 60-68, IEEE, Hong Kong, China.

Gorban, et al., "Blessing of dimensionality: mathematical foundations of the statistical physics of data", Philosophical Transactions of the Royal Society A: Mathematical, Physical and Engineering Sciences, 376.2118, Jan. 2008, 18 pages, The Royal Society Publishing.

Grover, et al., "node2vec: Scalable Feature Learning for Networks", KDD '16: Proceedings of the 22nd ACM SIGKDD International Conference on Knowledge Discovery and Data Mining, Aug. 2016, pp. 855-864, Association for Computing Machinery, New York, NY.

Hamilton, et al., "Representation Learning on Graphs: Methods and Applications", Bulletin of the IEEE Computer Society Technical Committee on Data Engineering, 2017, 23 pages, IEEE.

Hammer, et al., "A Reasoning Based Model for Anomaly Detection in the Smart City Domain", IntelliSys 2020, AISC 1251, pp. 144-159, 2021, Springer Nature Switzerland AG.

Hobbs, Jerry R., "Granularity", In Proceedings of the Ninth International Joint Conference on Artificial Intelligence, 1985, pp. 432-435, Morgan Kaufmann.

Horowitz, Alexandra, "Smelling themselves: Dogs investigate their own odours longer when modified in an "olfactory mirror" test", Behavioural Processes, 2017, 41 pages.

Jacob, et al., "A Demonstration of the Exathlon Benchmarking Platform for Explainable Anomaly Detection", Proceedings of the VLDB Endowment (PVLDB), Oct. 2021, 5 pages, HAL Open Science.

Jawed, et al., "Self-Supervised Learning for Semi-Supervised Time Series Classification", Pacific-Asia Conference on Knowledge Discovery and Data Mining, PAKDD 2020: Advances in Knowledge Discovery and Data Mining, May 2020, pp. 499-511, Lecture Notes in Computer Science, vol. 12084.

Johnson, Mark, "The Body in The Mind", 1987, 268 pages, The University of Chicago Press.

Jordan, Jeremy, "An Overview of Semantic Image Segmentation", online: https://www.jeremyjordan.me/semantic-segmentation/, May 21, 2018, 20 pages.

Keita, Zoumana, "YOLO Object Detection Explained", online: https://www.datacamp.com/blog/yolo-object-detection-explained, accessed Aug. 15, 2023, 14 pages.

Kiryati, et al., "A probabilistic Hough transform", Pattern Recognition. 24(4), 1991, pp. 303-316, The Pattern Recognition Society.

Korzybski, Alfred, "Manhood of Humanity, The Science and Art of Human Engineering", 1921, 240 pages, E. P. Dutton & Company, New York, NY.

(56) References Cited

OTHER PUBLICATIONS

Korzybski, Alfred, "Science and Sanity: An Introduction to Non-Aristotelian Systems and General Semantics", 5th Edition, 1994, 910 pages, Institute of General Semantics, New York, NY.

Korzybski, Alfred, "Videos—This Is Not That", online: https://www.thisisnotthat.com/korzybski-videos/, accessed Nov. 18, 2021, 7 pages.

Lakoff, G., "Women, Fire, and Dangerous Things", 1984, 631 pages, University of Chicago Press.

Latapie, et al., "A Metamodel and Framework for Artificial General Intelligence from Theory to Practice", Journal of Artificial Intelligence and Consciousness, Feb. 12, 2021, 1:30, 24 pages, World Scientific Publishing Company.

Li, et al., "Concept learning via granular computing: A cognitive viewpoint", Information Sciences 298 (2015), Published Dec. 2014, pp. 447-467, Elsevier Inc.

Li, et al., "Self-supervised Social Relation Representation for Human Group Detection", European Conference on Computer Vision (ECCV 2022, Oral), 17 pages.

Li, et al., "Unsupervised Learning of View-invariant Action Representations", 32nd Conference on Neural Information Processing Systems (NeurIPS 2018), 11 pages, Montréal, Canada.

Lin, et al., "Progressive Mirror Detection", 2020 IEEE/CVF Conference on Computer Vision and Pattern Recognition (CVPR), Jun. 2020, 9 pages, IEEE, Seattle, WA.

Ma, et al., "Granular computing and Dual Galois Connection", Information Sciences, 177(23), 2007, pp. 5365-5377, Elsevier Inc.

Macaulay, Thomas, "Facebook's chief AI scientist says GPT-3 is 'not a very good' Q&A system", online: https://thenextweb.com/news/facebooks-yann-lecun-says-gpt-3-is-not-very-good-as-a-qa-or-dialog-system, Oct. 28, 2020, accessed Nov. 18, 2021, 3 pages.

Murahari, et la., "Improving Generative Visual Dialog by Answering Diverse Questions", Proceedings of the 2019 Conference on Empirical Methods in Natural Language Processing and the 9th International Joint Conference on Natural Language Processing, Nov. 2018, pp. 1449-1454, Association for Computational Linguistics, Hong Kong, China.

Nauman, et al., "Identification of Anomalous Behavioral Patterns in Crowd Scenes", Computers, Materials & Continua, 71(1), Jan. 2022, pp. 925-939.

Park, et al., "Identifying Reflected Images from Object Detector in Indoor Environment Utilizing Depth Information", IEEE Robotics and Automation Letters, vol. 6, No. 2, Apr. 2021, pp. 635-642, IEEE.

Patel, et al., "Video Representation and Suspicious Event Detection Using Semantic Technologies", online: http://semantic-web-journal.net/system/files/swj2427.pdf, Semantic Web 0, Sep. 10, 2020, accessed Aug. 9, 2021, 25 pages, IOS Press.

Pauli, Wolfgang, "Part I. General: (A) theory. Some relations between electrochemical behaviour and the structure of colloids", Jan. 1935, pp. 11-27, Transactions of the Faraday Society, vol. 1.

Rao, et al., "Detection of Anomalous Crowd Behaviour Using Hyperspherical Clustering", "Detection of Anomalous Crowd Behaviour Using Hyperspherical Clustering", Nov. 2014, IEEE, Wollongong, NSW, Australia.

Sanchez, et al., "Revisiting crowd behaviour analysis through deep learning: Taxonomy, anomaly detection, crowd emotions, datasets, opportunities and prospects", Inf Fusion, 97, (2020), Published online Jul. 29, 2020, pp. 318-335, Elsevier B.V.

Scarselli, et al., "The Graph Neural Network Model", IEEE Transactions on Neural Networks (vol. 20, Issue: 1, Jan. 2009), pp. 61-80, IEEE.

Shan, et al., COHESIV: Contrastive Object and Hand Embeddings for Segmentation In Video, 35th Conference on Neural Information Processing Systems (NeurIPS 2021), 12 pages.

Speer, et al., "ConceptNet 5.5: An Open Multilingual Graph of General Knowledge", online: https://arxiv.org/pdf/1612.03975.pdf, 2017, 9 pagers, Association for the Advancement of Artificial Intelligence.

Swanson, Bret, "The Exponential Internet", online: https://www.uschamberfoundation.org/bhq/exponential-internet, accessed Nov. 19, 2021, 8 pages, The U.S. Chamber of Commerce Foundation.

Tan, et al., "EfficientDet: Scalable and Efficient Object Detection", online: https://arxiv.org/pdf/1911.09070.pdf, Jul. 2020, 10 pages.

Taylor, J. G., "CODAM: A neural network model of consciousness", Neural Networks 20 (2007), pp. 983-992, Elsevier Ltd.

Thórisson, et al., "Cumulative Learning", Artificial General Intelligence—12th International Conference, AGI 2019, Proceedings, pp. 198-208, Springer.

Thórisson, Kristinn R., "A New Constructivist AI: From Manual Methods to Self-Constructive Systems", Chapter 9, Apr. 2012, pp. 147-174, Atlantis Press Book.

Thórisson, Kristinn R., "Integrated AI Systems", Minds & Machines 17, Mar. 2007, pp. 11-25.

Tonioni, et al., "Product recognition in store shelves as a sub-graph isomorphism problem", online: https://arxiv.org/abs/1707.08378, Sep. 2017, 14 pages.

Tripathy, et al., "Explaining Anomalies in Industrial Multivariate Time-Series Data with the Help of explainable AI", 2022 IEEE International Conference on Big Data and Smart Computing (BigComp), Jan. 2022, 8 pages, IEEE, Republic of Korea.

Unger, et al., "The Singular Universe and the Reality of Time: A Proposal in Natural Philosophy", 2015, 558 pages, Cambridge University Press.

Unger, R. M. 2014. "Roberto Unger: Free Classical Social Theory from Illusions of False Necessity", Online Lecture. 45 pages Retrieved on Nov. 22, 2021 from https://www.youtube.com/watch?v=yYOOwNRFTcY.

Wang, et al., A Deep-Learning Based Feature Hybrid Framework for Spatiotemporal Saliency Detection inside Videos, Neurocomputing, 287. pp. 68-83.

Wang, et al., "Concept Analysis via Rough Set and AFS Algebra", Information Sciences 178 (2008), pp. 4125-4137, Elsevier Inc.

Wang, Pei, "Experience-grounded semantics: a theory for intelligent systems", Aug. 2004, 33 pages, Elsevier Science.

Wang, Pei, "Insufficient Knowledge and Resources—A Biological Constraint and Its Functional Implications", Biologically Inspired Cognitive Architectures II: Papers from the AAAI Fall Symposium (FS-09-01), 2009, pp. 188-193, Association for the Advancement of Artificial Intelligence (www.aaai.org).

Wang, Pei, "Non-axiomatic logic (nal) specification", online: http://citeseerx.ist.psu.edu/viewdoc/download?doi=10.1.1.167.2069&rep=rep1&type=pdf, Oct. 2009, 88 pages.

Wang, Pei, "On Defining Artificial Intelligence", Journal of Artificial General Intelligence 10(2) 2019, pp. 1-37, Sciendo.

Wang, et al. "Self in NARS, an AGI System", vol. 5, Article 20, Mar. 2018, 15 pages, Frontiers in Robotics and AI.

Wang, et al., "SuperGLUE: A Stickier Benchmark for General-Purpose Language Understanding Systems", online: https://arxiv.org/pdf/1905.00537.pdf, 2019, 29 pages, 33rd Conference on Neural Information Processing Systems (NeurIPS 2019), Vancouver, Canada.

Wikipedia, "Wheat and chessboard problem", online: https://en.wikipedia.org/wiki/Wheat_and_chessboard_problem, Oct. 2021, 5 pages, Wikimedia Foundation, Inc.

Wille, Rudolf, "Restructuring Lattice Theory: An Approach Based on Hierarchies of Concepts", I. Rival (Ed.), Ordered Sets, 1982, pp. 314-339.

Xue, et al., "Real-Time Anomaly Detection and Feature Analysis Based on Time Series for Surveillance Video", IEEE 5th International Conference on Universal Village • UV2020 • Session 3ABD-7, Oct. 2020, 7 pages, IEEE, Boston, MA.

Yang, et al., "Semi-automatic Image and Video Annotation System for Generating Ground Truth Information", 2018 International Conference on Information Networking (ICOIN), Jan. 2018, pp. 821-824, IEEE, Chiang Mai, Thailand.

Yao, et al., " A Granular Computing Paradigm for Concept Learning", Emerging Paradigms in Machine Learning, Springer, London, pp. 307-326, 2012.

Yao, Y. Y., "Information Granulation and Rough Set Approximation", International Journal of Intelligent Systems, vol. 16, No. 1, 87-104, 2001.

(56) References Cited

OTHER PUBLICATIONS

Yao, Y. Y., "Integrative levels of granularity", Human-Centric Information Processing Through Granular Modelling, 2009, 20 pages, Studies in Computational Intelligence, vol. 182. Springer, Berlin, Heidelberg.

Ying, et al., "Graph convolutional neural networks for web-scale recommender systems", online: https://arxiv.org/pdf/1806.01973. pdf, In KDD '18: The 24th ACM SIGKDD International Conference on Knowledge Discovery & Data Mining, Aug. 19-23, 2018, London, United Kingdom. ACM, New York, NY, USA, 10 pages.

Zhou, et al., "Graph neural networks: A review of methods and applications", AI Open, 2020, pp. 57-81, Elsevier B.V.

Zhu, et al., "Describing Unseen Videos via Multi-modal Cooperative Dialog Agents" Computer Vision—ECCV 2020, 17 pages, Lecture Notes in Computer Science, vol. 12368. Springer.

Zhu, et al., "Semantic Relation Reasoning for Shot-Stable Few-Shot Object Detection", 2021 IEEE/CVF Conference on Computer Vision and Pattern Recognition (CVPR), Jun. 2021, 10 pages IEEE.

\* cited by examiner

OUTPUT 414

SYMBOLIC LAYER 406

NARS 410

CONCEPTUAL LAYER 404

CONCEPTUAL DIMENSIONS

•

SUB-SYMBOLIC LAYER 402

DNN(s) 408

SENSOR DATA 412

AUTOMATIC LABELING AND EVENT DETECTION FOR VIDEO ANALYTICS USING HYBRID AI

TECHNICAL FIELD

The present disclosure relates generally to computer networks, and, more particularly, to the automatic labeling and event detection for video analytics using hybrid artificial intelligence (AI).

BACKGROUND

Video analytics techniques are becoming increasingly ubiquitous as a complement to new and existing surveillance systems. For instance, person detection and reidentification now allows for a specific person to be tracked across different video feeds throughout a location. More advanced video analytics techniques also attempt to detect certain types of events/activities, such as a person leaving a suspicious package in an airport. Underlying such functionality are machine learning (ML)/deep learning (DL) models that have been trained using a set of training data that include examples of the objects or activities to be detected by the model.

One of the key challenges in training an ML/DL video analytics model relates to the establishment of the ground truth on which the model is trained. More specifically, the ground truth may take the form of images and/or video that have been labeled correctly as positive (or negative) examples of a given object type or action. For instance, in the case of person detection, the training data may include any number of images of people that have been labeled as depicting people. Based on the labeled training data, the model can be trained to identify the image features associated with people, to determine whether a new image depicts a person or not.

Currently, ground truth generation is largely a manual task that requires human curation and labeling of a training dataset. However, this can be a very cumbersome and tedious process, as a very large training dataset is often needed for acceptable model performance (e.g., on the order of thousands of labeled samples). In addition, human error can also lead to a given sample being mislabeled, especially in the case of having to manually label a large number of samples.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

Figure 1:
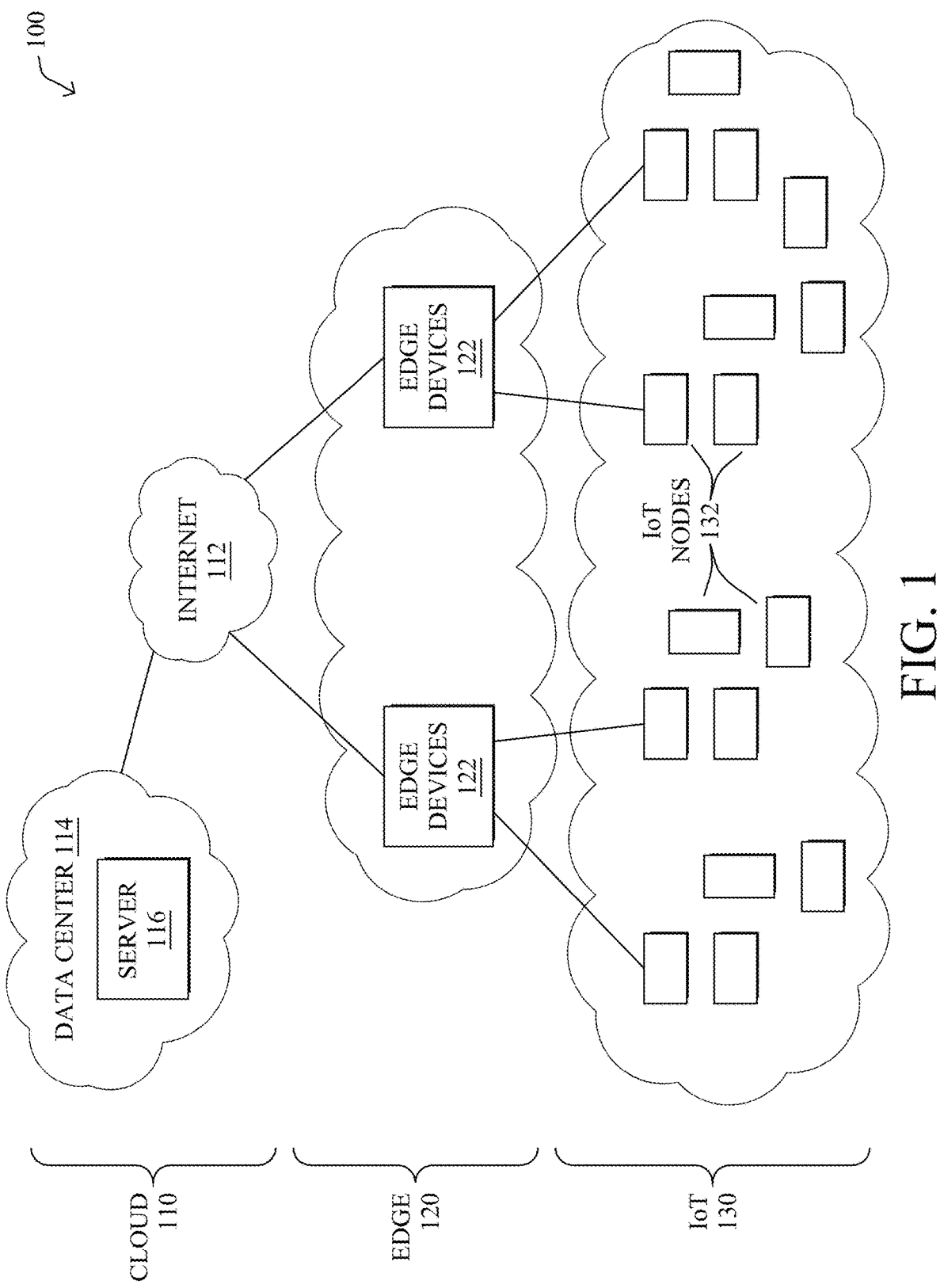
FIG. 1 illustrate an example network.

According to one or more implementations, a device receives a request to generate a set of video clips that depict a specified classification label. The device represents each of one or more objects depicted in a particular video clip over time as a set of timeseries of key points associated with that object. The device makes a determination as to whether the particular video clip depicts the specified classification label by analyzing the set of timeseries of key points associated with the particular video clip and in accordance with one or more constraint parameters. The device labels, based on the determination, the particular video clip with the specified classification label for inclusion in the set of video clips that depict the specified classification label.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. Other types of networks, such as field area networks (FANs), neighborhood area networks (NANs), personal area networks (PANs), etc. may also make up the components of any given computer network.

In various implementations, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or wired networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words. LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, wired links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), or other shared-media protocols where appropriate. In this context, a protocol consists of a set of rules defining how the nodes interact with each other.

Figure 2:
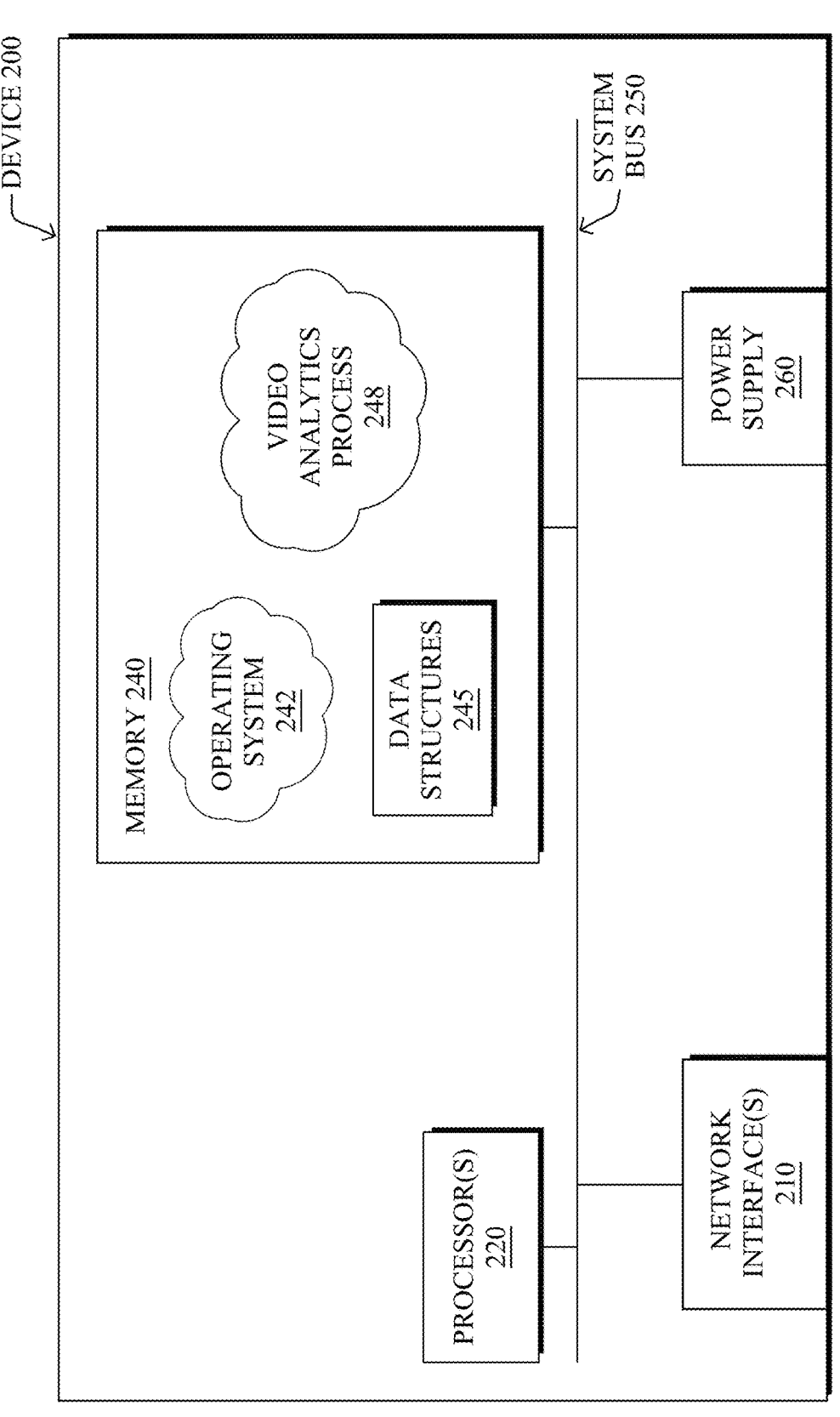
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration.

The memory 240 comprises a plurality of storage locations that are addressable by the processor 220 and the network interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative video analytics process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various implementations, video analytics process 248 may employ one or more supervised, unsupervised, or self-supervised machine learning models. Generally, supervised learning entails the use of a training set of data that is used to train the model to apply labels to the input data. For example, the training data may include sample video data depicting a particular event that has been labeled as such. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Self-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

Figure 3:
FIG. 3 illustrates an example system for performing video analytics.
Figure 3:
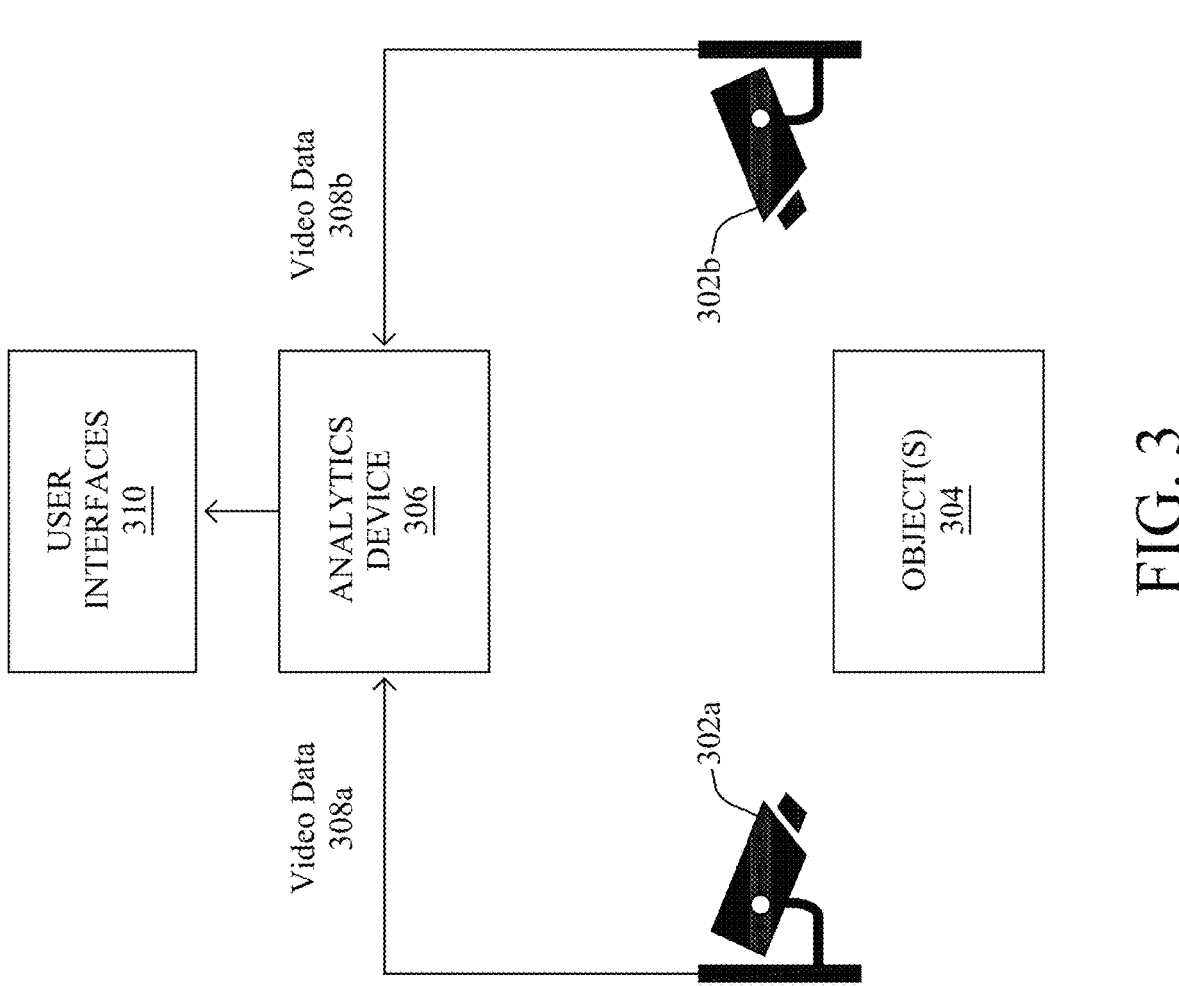

FIG. 3 illustrates an example system 300 for performing video analytics, as described in greater detail above. As shown, there may be any number of cameras 302 deployed to a physical area, such as cameras 302a-302b. Such surveillance is now fairly ubiquitous across various locations including, but not limited to, public transportation facilities (e.g., train stations, bus stations, airports, etc.), entertainment facilities (e.g., sports arenas, casinos, theaters, etc.), schools, office buildings, and the like. In addition, so-called "smart" cities are also now deploying surveillance systems for purposes of monitoring vehicular traffic, crime, and other public safety events.

Regardless of the deployment location, cameras 302a-302b may generate and send video data 308a-308b, respectively, to an analytics device 306 (e.g., a device 200 executing video analytics process 248 in FIG. 2). For instance, analytics device 306 may be an edge device (e.g., an edge device 122 in FIG. 1), a remote server (e.g., a server 116 in FIG. 1), or may even take the form of a particular endpoint in the network, such as a dedicated analytics device, a particular camera 302, or the lie.

In general, analytics device 306 may be configured to provide video data 308a-308b for display to one or more user interfaces 310, as well as to analyze the video data for events that may be of interest to a potential user. To this end, analytics device 306 may perform object detection on video data 308a-308b, to detect and track any number of objects 304 present in the physical area and depicted in the video data 308a-308b. In some implementations, analytics device 306 may also perform object re-identification on video data 308a-308b, allowing it to recognize an object 304 in video data 308a as being the same object in video data 308b or vice-versa.

Figure 4:
FIG. 4 illustrates an example hierarchy for a neuro-symbolic metamodel.
Figure 4:
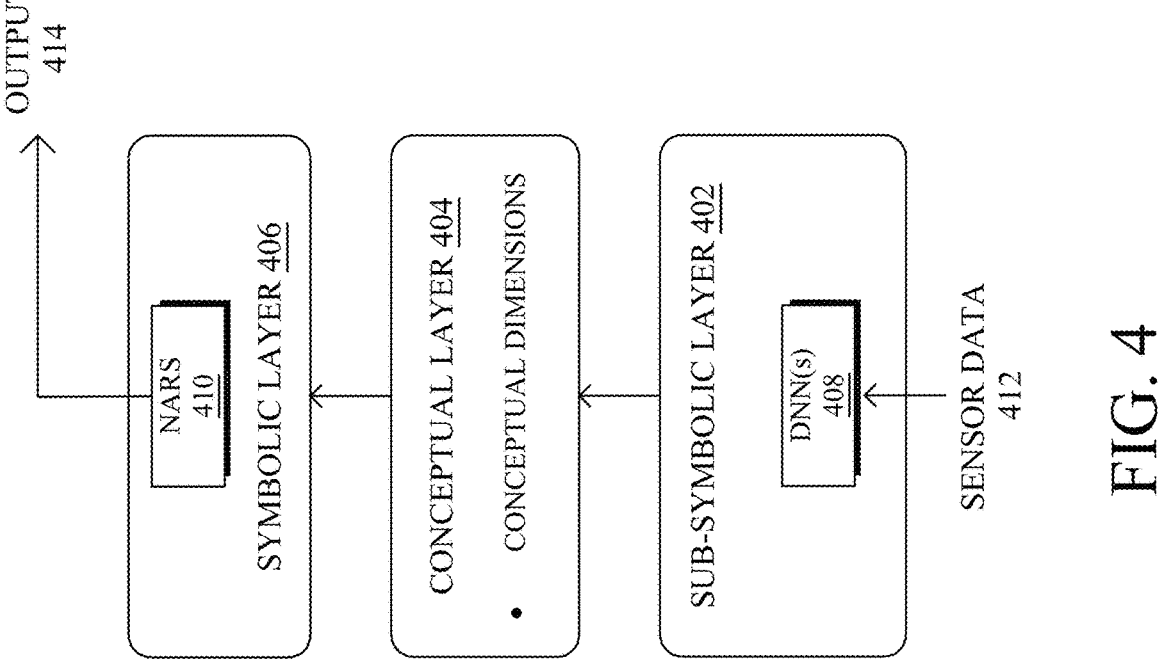

According to various implementations, FIG. 4 illustrates an example hierarchy 400 for a neuro-symbolic metamodel. For example, metamodel process 248 shown in FIG. 2 may execute a neuro-symbolic metamodel for any number of purposes. In particular, metamodel process 248 may be configured to analyze sensor data in an IoT deployment (e.g., video data, etc.), to analyze networking data for purposes of network assurance, control, enforcing security policies and detecting threats, facilitating collaboration, or, as described in greater detail below, to aid in the development of a collaborative knowledge generation and learning system for visual programming.

In general, a reasoning engine, also known as a 'semantic reasoner,' 'reasoner,' or 'rules engine,' is a specialized form of machine learning software that uses asserted facts or axioms to infer consequences, logically. Typically, a reasoning engine is a form of inference engine that applies inference rules defined via an ontology language. As introduced herein, a neuro-symbolic metamodel is an enhanced form of reasoning engine that further leverages the power of sub-symbolic machine learning techniques, such as neural networks (e.g., deep learning), allowing the system to operate across the full spectrum of sub-symbolic data all the way to the symbolic level.

At the lowest layer of hierarchy 400 is sub-symbolic layer 402 that processes the sensor data 412 collected from the network. For example, sensor data 412 may include video feed/stream data from any number of cameras located throughout a location. In some implementations, sensor data 412 may comprise multimodal sensor data from any number of different types of sensors located throughout the location. At the core of sub-symbolic layer 402 may be one or more DNNs 408 or other machine learning-based model that processes the collected sensor data 412. In other words, sub-symbolic layer 402 may perform sensor fusion on sensor data 412 to identify hidden relationships between the data.

At the opposing end of hierarchy 400 may be symbolic layer 406 that may leverage symbolic learning. In general, symbolic learning includes a set of symbolic grammar rules specifying the representation language of the system, a set of symbolic inference rules specifying the reasoning competence of the system, and a semantic theory containing the definitions of "meaning." This approach differs from other learning approaches that try to establish generalizations from facts as it is about reasoning and extracting knowledge from knowledge. It combines knowledge representations and reasoning to acquire and ground knowledge from observations in a non-axiomatic way. In other words, in sharp contrast to the sub-symbolic learning performed in layer 402, the symbolic learning and generalized intelligence performed at symbolic layer 406 requires a variety of reasoning and learning paradigms that more closely follows how humans learn and are able to explain why a particular conclusion was reached.

Symbolic learning models what are referred to as "concepts," which comprise a set of properties. Typically, these properties include an "intent" and an "extent," whereby the intent offers a symbolic way of identifying the extent of the concept. For example, consider the intent that represents motorcycles. The intent for this concept may be defined by properties such as "having two wheels" and "motorized," which can be used to identify the extent of the concept (e.g., whether a particular vehicle is a motorcycle).

Linking sub-symbolic layer 402 and symbolic layer 406 may be conceptual layer 404 that leverages conceptual spaces. In general, conceptual spaces are a proposed framework for knowledge representation by a cognitive system on the conceptual level that provides a natural way of representing similarities. Conceptual spaces enable the interaction between different type of data representations as an intermediate level between sub-symbolic and symbolic representations.

More formally, a conceptual space is a geometrical structure which is defined by a set of quality dimensions to allow for the measurement of semantic distances between instances of concepts and for the assignment of quality values to their quality dimensions, which correspond to the properties of the concepts. Thus, a point in a conceptual space S may be represented by an n-dimensional conceptual vector $v = <d_1, \ldots, d_i, \ldots, d_n>$ where $d_i$ represents the quality value for the $i^{th}$ quality dimension. For example, consider the concept of taste. A conceptual space for taste may include the following dimensions: sweet, sour, bitter, and salty, each of which may be its own dimension in the conceptual space. The taste of a given food can then be represented as a vector of these qualities in a given space (e.g., ice cream may fall farther along the sweet dimension than that of peanut butter, peanut butter may fall farther along the salty dimension than that of ice cream, etc.). By representing concepts within a geometric conceptual space, similarities can be compared in geometric terms, based on the Manhattan distance between domains or the Euclidean distance within a domain in the space. In addition, similar objects can be grouped into meaningful conceptual space regions through the application of clustering techniques, which extract concepts from data (e.g., observations).

Said differently, a conceptual space is a framework for representing information that models human-like reasoning to compose concepts using other existing concepts. Note that these representations are not competing with symbolic or associationistic representations. Rather, the three kinds can be seen as three levels of representations of cognition with different scales of resolution and complementary. Namely, a conceptual space is built up from geometrical representations based on a number of quality dimensions that complements the symbolic and deep learning models of symbolic layer 406 and sub-symbolic layer 402, representing an operational bridge between them. Each quality dimension may also include any number of attributes, which present other features of objects in a metric subspace based on their measured quality values. Here, similarity between concepts is just a matter of metric distance between them in the conceptual space in which they are embedded.

In other words, a conceptual space is a geometrical representation which allows the discovery of regions that are physically or functionally linked to each other and to abstract symbols used in symbolic layer 406, allowing for the discovery of correlations shared by the conceptual domains during concepts formation. For example, an alert prioritization module may use connectivity to directly acquire and evaluate alerts as evidence. Possible enhancements may include using volume of alerts and novelty of adjacent (spatially/temporally) alerts, to tune level of alertness.

In general, the conceptual space at conceptual layer 404 allows for the discovery of regions that are naturally linked to abstract symbols used in symbolic layer 406. The overall model is bi-directional as it is planned for predictions and action prescriptions depending on the data causing the activation in sub-symbolic layer 402.

Layer hierarchy 400 shown is particularly appealing when matched with the attention mechanism provided by a cognitive system that operates under the assumption of limited resources and time-constraints. For practical applications, the reasoning logic in symbolic layer 406 may be non-axiomatic and constructed around the assumption of insufficient knowledge and resources (AIKR). It may be implemented, for example, with a Non-Axiomatic Reasoning System (open-NARS) 410. However, other reasoning engines can also be used, such as Auto-catalytic Endogenous Reflective Architecture (AERA), OpenCog, and the like, in symbolic layer 406, in further implementations. Even Prolog may be suitable, in some cases, to implement a reasoning engine in symbolic layer 406. In turn, an output 414 coming from symbolic layer 406 may be provided to a user interface (UI) for review. For example, output 414 may comprise a video feed/stream augmented with inferences or conclusions made by the metamodel, such as the locations of unstocked or under-stocked shelves, etc.

By way of example of symbolic reasoning, consider the ancient Greek syllogism: (1.) All men are mortal, (2.) Socrates is a man, and (3.) therefore, Socrates is mortal. Depending on the formal language used for the symbolic reasoner, these statements can be represented as symbols of a term logic. For example, the first statement can be represented as "man→[mortal]" and the second statement can be represented as "{Socrates}→man." Thus, the relationship between terms can be used by the reasoner to make inferences and arrive at a conclusion (e.g., "Socrates is mortal"). Non-axiomatic reasoning systems (NARS) generally differ from more traditional axiomatic reasoners in that the former applies a truth value to each statement, based on the amount of evidence available and observations retrieved, while the latter relies on axioms that are treated as a baseline of truth from which inferences and conclusions can be made.

Thus, a neuro-symbolic metamodel generally refers to a cognitive engine capable of taking sub-symbolic data as input (e.g., raw or processed sensor data regarding a monitored system), recognizing symbolic concepts from that data, and applying symbolic reasoning to the concepts, to draw conclusions about the monitored system.

Figure 5:
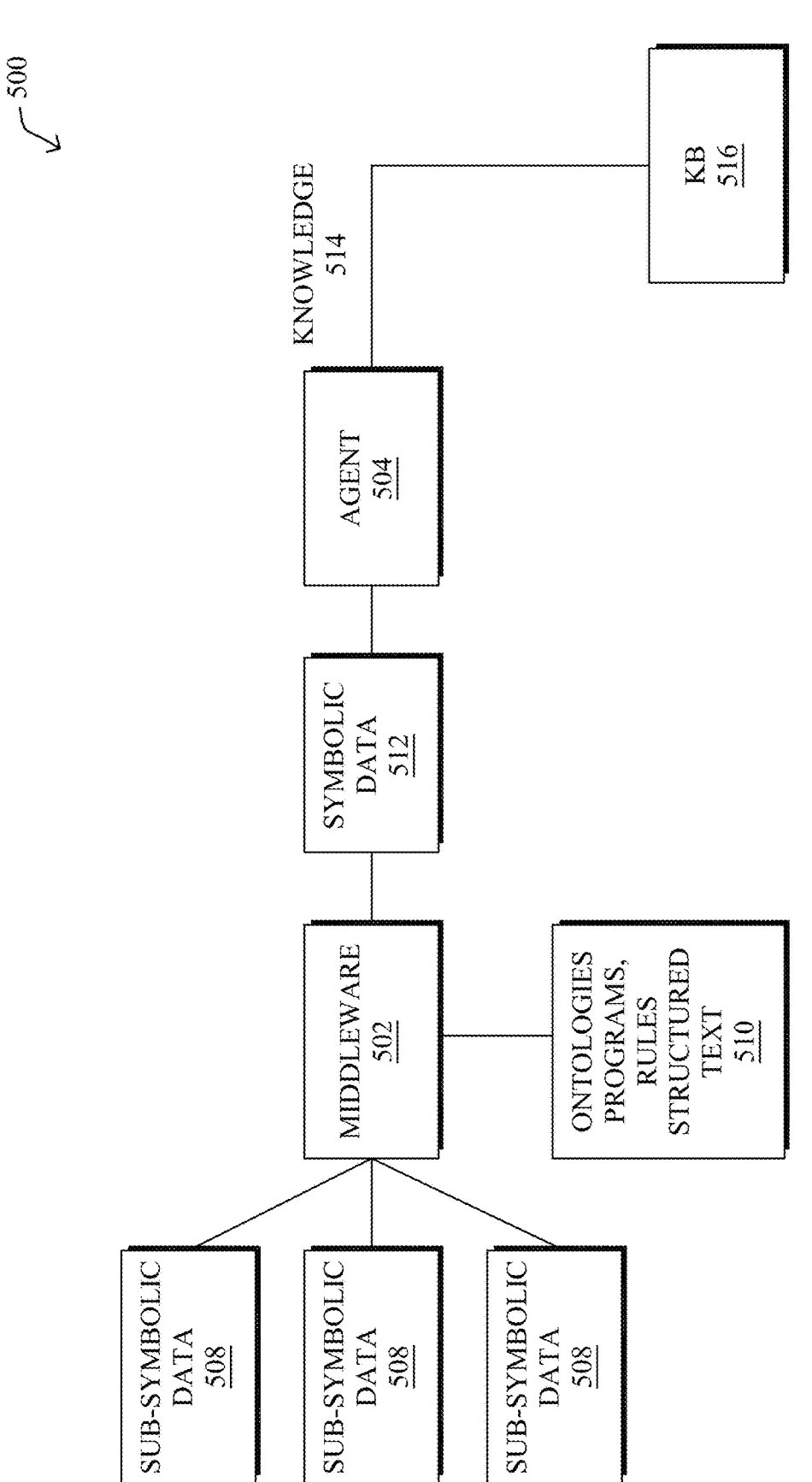
FIG. 5 illustrates an example metamodel architecture.

According to various implementations, FIG. 5 illustrates an example neuro-symbolic metamodel architecture 500. As shown, architecture 500 may be implemented across any number of devices or fully on a particular device, as desired. At the core of architecture 500 may be middleware 502 that offers a collection of services, each of which may have its own interface. In general, middleware 502 may leverage a library for interfacing, configuring, and orchestrating each service of middleware 502.

In various implementations, middleware 502 may also provide services to support semantic reasoning, such as by an AIKR reasoner. For example, as shown, middleware 502 may include a NARS agent that performs semantic reasoning for structural learning. In other implementations, Open-Cog or another suitable AIKR semantic reasoner could be used.

A metamodel agent 504, or multiple such agents, may interface with middleware 502 to orchestrate the various services available from middleware 502. In addition, metamodel agent 504 may feed and interact with the AIKR reasoner so as to populate and leverage a metamodel knowledge graph with knowledge.

More specifically, in various implementations, middleware 502 may obtain sub-symbolic data 508. In turn, middleware 502 may leverage various ontologies, programs, rules, and/or structured text 510 to translate sub-symbolic data 508 into symbolic data 512 for consumption by metamodel agent 504. This allows metamodel agent 504 to apply symbolic reasoning to symbolic data 512, to populate and update a metamodel knowledge base (KB) 516 with knowledge 514 regarding the problem space (e.g., the network under observation, etc.). In addition, metamodel agent 504 can leverage the stored knowledge 514 in metamodel KB 516 to make assessments/inferences.

For example, metamodel agent 504 may perform semantic graph decomposition on metamodel KB 516 (e.g., a knowledge graph), so as to compute a graph from the knowledge graph of KB 516 that addresses a particular problem. Metamodel agent 504 may also perform post-processing on metamodel KB 516, such as performing graph cleanup, applying deterministic rules and logic to the graph, and the like. Metamodel agent 504 may further employ a definition of done, to check goals and collect answers using metamodel KB 516.

In general, metamodel KB 516 may comprise any or all of the following:

Data
Ontologies
Evolutionary steps of reasoning
Knowledge (e.g., in the form of a knowledge graph)
The Knowledge graph also allows different reasoners to:
    Have their internal subgraphs
    Share or coalesce knowledge
    Work cooperatively In other words, metamodel KB 516 acts as a dynamic and generic memory structure. In some implementations, metamodel KB 516 may also allow different reasoners to share or coalesce knowledge, have their own internal sub-graphs, and/or work collaboratively in a distributed manner. For example, a first instance of metamodel agent 504 may perform reasoning on a first sub-graph, a second instance of metamodel agent 504 may perform reasoning on a second sub-graph, etc., to evaluate the health of the network and/or find solutions to any detected problems. To communicate with metamodel agent 504, metamodel KB 516 may include a bidirectional Narsese interface or other interface using another suitable grammar.

In various implementations, metamodel KB 516 can be visualized on a user interface. For example, Cytoscape, which has its building blocks in bioinformatics and genomics, can be used to implement graph analytics and visualizations.

Said differently, architecture 500 may include any or all of the following the following components:

Middleware 502 that comprises:
    Structural learning component
    JSON, textual data, ML/DL pipelines, and/or other containerized services (e.g., using Docker)
    Hierarchical goal support
Metamodel Knowledge Base (KB) 516 that supports:
    Bidirectional Narseseese interface
    Semantic graph decomposition algorithms
    Graph analytics
    Visualization services
Metamodel agent 504
    Metamodel Control System
More specifically, in some implementations, middleware 502 may include any or all of the following:
Subsymbolic services:
    Data services to collect sub-symbolic data for consumption
Reasoner(s) for structural learning
NARS
OpenCog
Optimized hierarchical goal execution
    Probabilistic programming
    Causal inference engines
Visualization Services (e.g., Cytoscape, etc.)
Middleware 502 may also allow the addition of new services needed by different problem domains.

During execution, metamodel agent 504 may, thus, perform any or all of the following:
Orchestration of services
Focus of attention Semantic graph decomposition Addresses combinatorial issues via an automated divide and conquer approach that works even in non-separable problems because the overall knowledge graph/KB 516 may allow for overlap.

Feeding and interacting with the AIKR reasoner via bidirectional translation layer to the metamodel knowledge graph.

Call middleware services

Post processing of the graph

Graph clean-up

Apply deterministic rules and logic to the graph

Definition of Done (DoD)

Check goals and collect answers

Figure 6:
FIG. 6 illustrates an example of various inference types.
Figure 6:
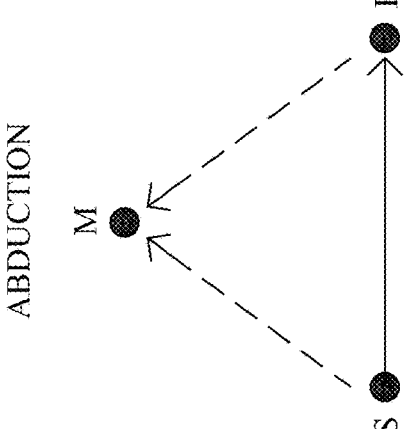
Figure 6:
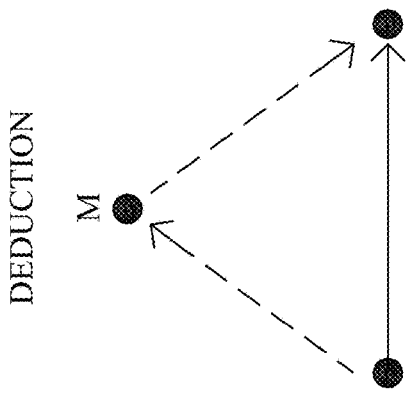
Figure 6:
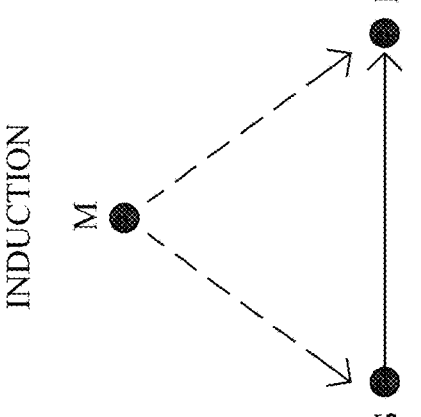
Figure 7:
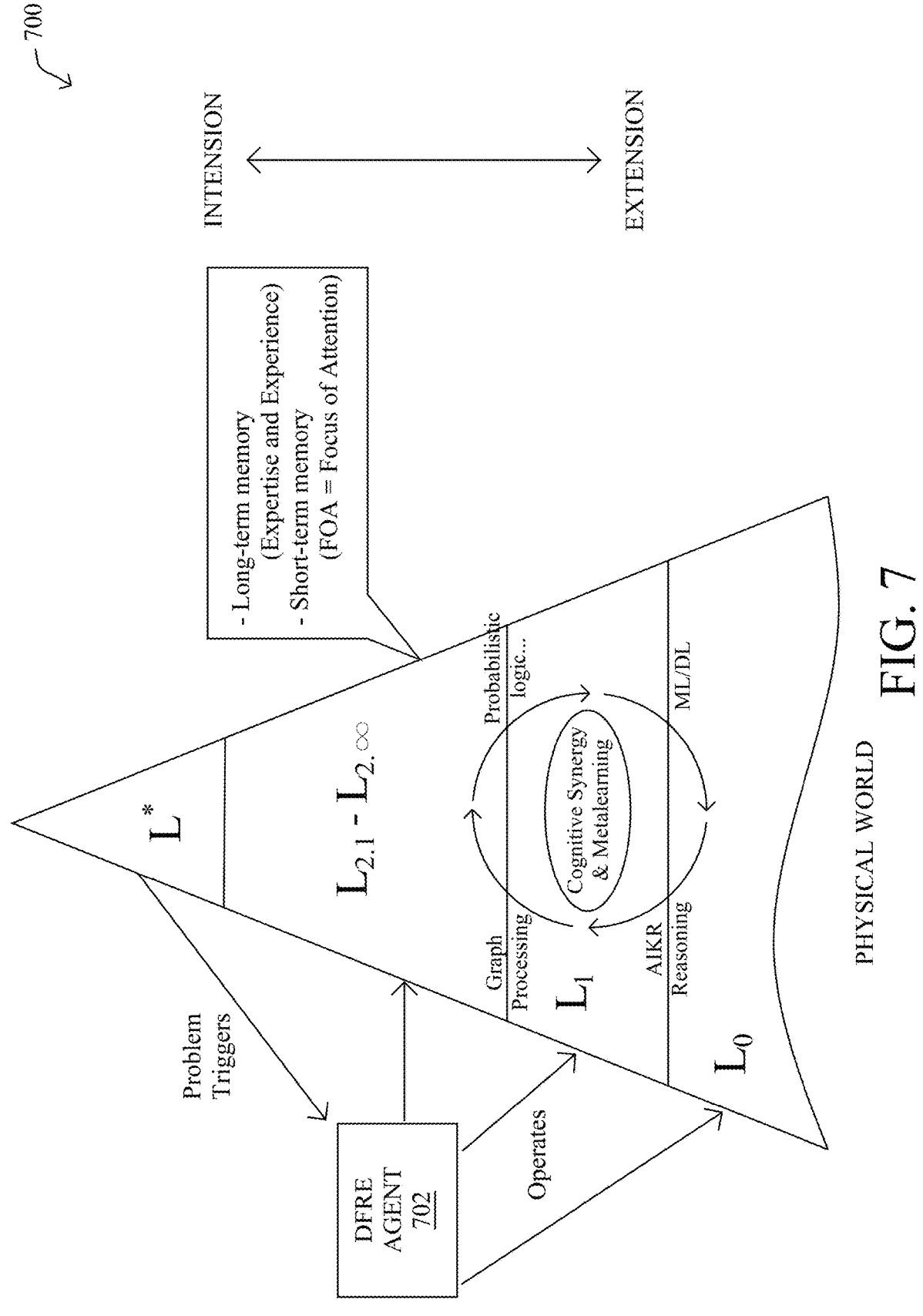
FIG. 7 illustrates an example neuro-symbolic metamodel.

FIG. 6 illustrates an example 600 showing the different forms of structural learning that the neuro-symbolic metamodel framework can employ. More specifically, the inference rules in example 600 relate premises S→M and M→P, leading to a conclusion S→P. Using these rules, the structural learning herein can be implemented using an ontology with respect to an Assumption of Insufficient Knowledge and Resources (AIKR) reasoning engine, as noted previously. This allows the system to rely on finite processing capacity in real time and be prepared for unexpected tasks. More specifically, as shown, the metamodel may support any or all of the following:

Syllogistic Logic

Logical quantifiers

Various Reasoning Types

Deduction Induction

Abduction

Induction

Revision

Different Types of Inference

Local inference

Backward inference

At the core of the techniques herein is a hybrid artificial intelligence (Hybrid AI) metamodel 700 for knowledge representation at different levels of abstraction, according to various implementations. In various implementations, the metamodel knowledge graph groups information into four different levels, which are labeled $L_0$, $L_1$, $L_2$, and $L^*$ and represent different levels of abstraction, with $L_0$ being closest to raw data coming in from various sensors and external systems and $L_2$ representing the highest levels of abstraction typically obtained via mathematical means such as statistical learning and reasoning. $L^*$ can be viewed as the layer where high-level goals and motivations are stored. The overall structure of this knowledge is also based on anti-symmetric and symmetric relations.

One key advantage of the metamodel knowledge graph is that human level domain expertise, ontologies, and goals are entered at the $L_2$ level. This leads, by definition, to an unprecedented ability to generalize at the $L_2$ level thus minimizing the manual effort required to ingest domain expertise.

More formally:

$L^*$ represents the overall status of the abstraction. In case of a problem, it triggers problem solving in lower layers via a metamodel agent 702.

$L_{2.1}$-$L_{2.\infty}$=Higher level representations of the world in which most of concepts and relations are collapsed into simpler representations. The higher-level representations are domain-specific representations of lower levels.

$L_1$=has descriptive, teleological and structural information about $L_0$.

$L_0$=Object level is the symbolic representation of the physical world.

In various implementations, $L_2$ may comprise both expertise and experience stored in long-term memory, as well as a focus of attention (FOA) in short-term memory. In other words, when a problem is triggered at $L^*$, a metamodel agent 702 that operates on $L_2$-$L_0$ may control the FOA so as to focus on different things, in some implementations.

As would be appreciated, there may be hundreds of thousands or even millions of data points that need to be extracted at $L_0$. The FOA of the metamodel is based on the abstraction and the knowledge graph (KG) may be used to keep combinatorial explosion under control.

Said differently, metamodel 700 may generally take the form of a knowledge graph in which semantic knowledge is stored regarding a particular system, such as a computer network and its constituent networking devices. By representing the relationships between such real-world entities (e.g., router A, router B, etc.), as well as their more abstract concepts (e.g., a networking router), metamodel agent 702 can make evaluations regarding the particular system at different levels of extraction. Indeed, metamodel 700 may differ from a more traditional knowledge graph through the inclusion of any or all of the following, in various implementations:

A formal mechanism to represent different levels of abstraction, and for moving up and down the abstraction hierarchy (e.g., ranging from extension to intension).

Additional structure that leverages distinctions/anti-symmetric relations, as the backbone of the knowledge structures.

Similarity/symmetric relation-based relations.

Thus, metamodel 700 is a neuro-symbolic metamodel that leverages both sub-symbolic processing (e.g., using deep/neural networks) and symbolic reasoning. This allows it to perform zero-shot learning whereby it is able to make inferences about objects, behaviors, interactions, conditions, and the like, that are outside those on which it was specifically trained, as well as one-shot learning of class labels. For instance, say the system uses a seed ontology comprising the concepts of 'standing' and 'running,' but then encounters video data of a person walking. Even without specific knowledge about the concept of walking, the semantic reasoning engine may determine that this is an intermediate state between standing and running, based on the velocities involved, the pose analysis of the person, etc. This allows the system to learn different conditions and make inferences about situations that it may not have seen before.

Figure 8:
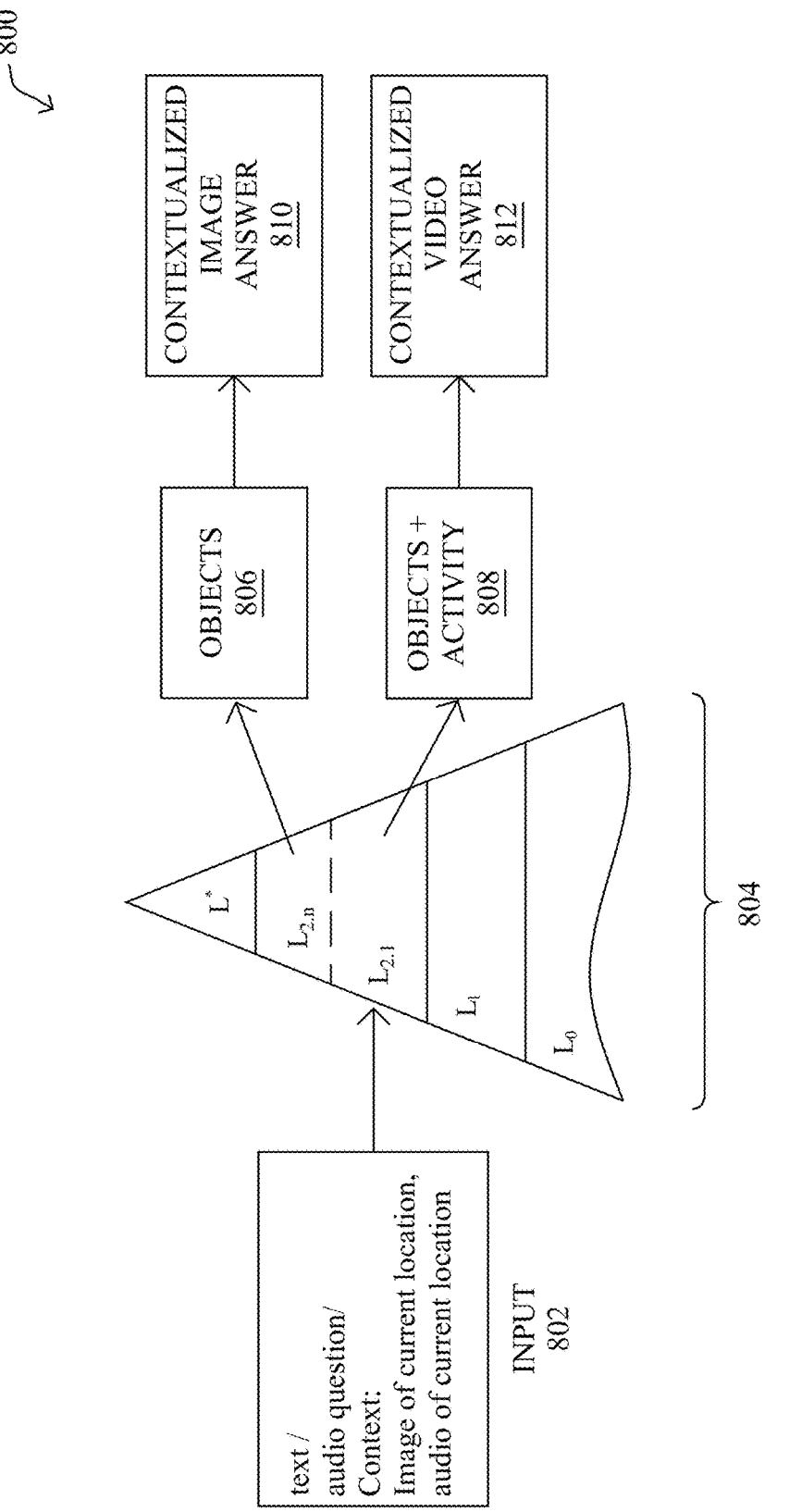
FIG. 8 illustrates an example of using a neuro-symbolic metamodel to generate contextualized answers.

FIG. 8 illustrates an example 800 of using a neuro-symbolic metamodel to generate contextualized answers, according to various implementations. As shown, assume that there is a neuro-symbolic metamodel 804, in accordance with the teachings above, that ingests sensor data from any number of different locations. In turn, metamodel 804 may utilize a sub-symbolic layer to analyze the sensor data, as well as a knowledge base that maps the outputs of the sub-symbolic layer to a symbolic layer on which a semantic reasoner may operate.

As shown, a requestor may send an input request 802 to neuro-symbolic metamodel 804 that includes a question (e.g., a request), which may be in text form, an audio/voice question, or the like. Such a question may, for instance, request a set of ground truth examples of a particular type. For example, the requestor may ask neuro-symbolic metamodel 804 for audio clips or files, video clips or files, and/or images that depict a particular type of object (e.g., a person, vehicle, etc.) and/or activity (which may be performed by or to a particular type of object).

In some implementations, input request 802 may also include context data regarding a particular location, which may be the physical location to be analyzed by the machine learning model that is to be trained using the set of ground truth examples output by neuro-symbolic metamodel 804. For instance, the context data of request 802 may take the form of one or more images of the location and/or audio captured from the location. In such a case, neuro-symbolic metamodel 804 may use the context data to help refine its search and identification of the ground truth examples. As would be appreciated, this can help improve the performance of the machine learning model that is to be trained using the ground truth examples.

Through its conceptual learning, neuro-symbolic metamodel 804 is able to learn concepts over time and its semantic reasoning engine may use these concepts to match the concepts in the input request 802 to the context and the concepts present in the request. In turn, neuro-symbolic metamodel 804 may output ground truth examples. For instance, in the case of simply examples of a particular type of objects 806 in the context, neuro-symbolic metamodel 804 may identify those images that depict the objects and return a contextualized image answer 810 with the set of matching images to the requestor. Similarly, if input request 802 asks for examples of objects associated with a particular behavior/activity 808, neuro-symbolic metamodel 804 may retrieve those examples as video clips or files and return them to the requestor as contextualized video answer 812.

As noted above, one of the key challenges in training a video analytics model relates to the establishment of the ground truth on which the model is trained. More specifically, the ground truth may take the form of images and/or video that have been labeled correctly as positive (or negative) examples of a given object type or action. For instance, in the case of person detection, the training data may include any number of images of people that have been labeled as depicting people. Based on the labeled training data, the model can be trained to identify the image features associated with people, to determine whether a new image depicts a person or not.

Currently, ground truth generation is largely a manual task that requires human curation and labeling of a training dataset. However, this can be a very cumbersome and tedious process, as a very large training dataset is often needed for acceptable model performance (e.g., on the order of thousands of labeled samples). In addition, human error can also lead to a given sample being mislabeled, especially in the case of having to manually label a large number of samples.

Automatic Labeling and Event Detection for Video Analytics Using Hybrid AI

The techniques herein introduce a system for automatically labeling video data. In some aspects, the system is also able to detect different objects, behaviors, and/or events, so as to generate sets of video data that are labeled according to a desired type of label.

Illustratively, the techniques described herein may be performed by hardware, software, and/or firmware, such as in accordance with the video analytics process 248, which may include computer executable instructions executed by the processor 220 (or independent processor of interfaces 210), to perform functions relating to the techniques described herein.

Specifically, according to various implementations, a device receives a request to generate a set of video clips that depict a specified classification label. The device represents each of one or more objects depicted in a particular video clip over time as a set of timeseries of key points associated with that object. The device makes a determination as to whether the particular video clip depicts the specified classification label by analyzing the set of timeseries of key points associated with the particular video clip and in accordance with one or more constraint parameters. The device labels, based on the determination, the particular video clip with the specified classification label for inclusion in the set of video clips that depict the specified classification label.

Figure 9A:
FIGS. 9A-9B illustrates an example of converting video data depicting an object over time into a set of key points and representing those sets as timeseries.
Figure 9A:
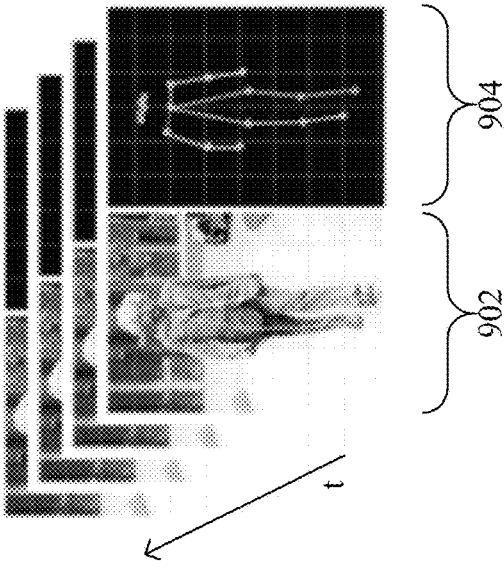
Figure 9B:
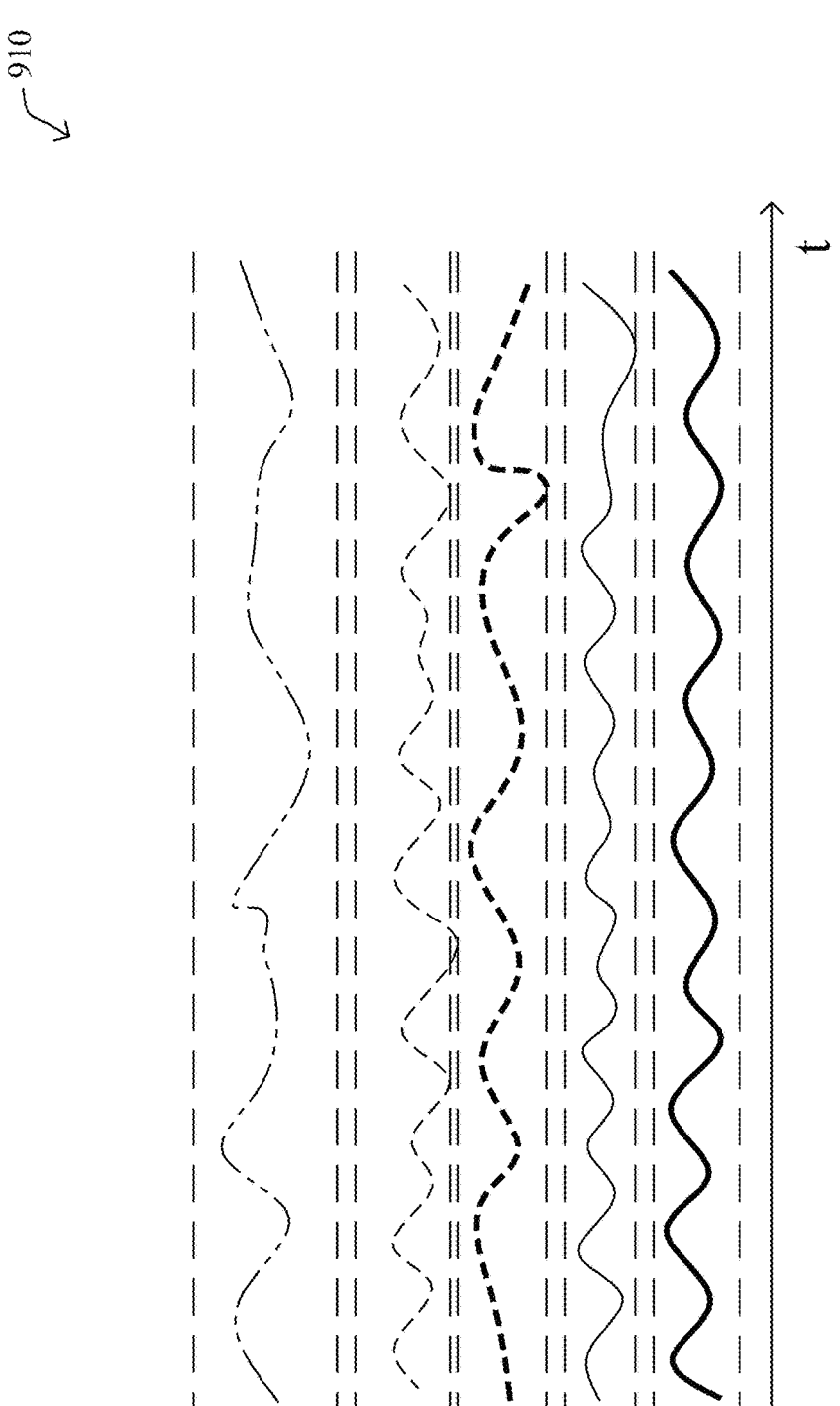

Operationally, FIGS. 9A-9B illustrates an example of converting video data depicting an object over time into a set of key points and representing those sets as timeseries. More specifically, FIG. 9A illustrates the extraction 900 of key points from video data 902 captured over time. As shown, assume that video data 902 depicts a person walking and comprises a series of images captured over time.

In various implementations, video analytics process 248 may employ pose estimation to the person in each image in video data 902, to extract out a corresponding set of key points 904 that represent the dynamics of the person. As would be appreciated, pose estimation generally seeks to model the pose/shape of a depicted person as a set of interconnected key points. For instance, the key points of the depicted person may be associated with different body parts of the person, such as different parts of their limbs, torso, neck, head, etc.

In some instances, each key point may present a joint or other point of articulation on the human body, allowing the connections between the key points to represent the different structures connected to these points of articulation. For example, one key point may represent the left knee of the person and have two connections: a first connection to another key point that represents the left hip of the person and a second connection that represents the left ankle of the person. Thus, the first connection will effectively represent the left thigh of the person and the second connection will effectively represent their left shin. Of course, the number of key points used for any given type of object may also be varied, as desired, as well.

As would be appreciated, different object may have different kinematic models that can be used to extract their key points from the captured video data. To this end, video analytics process 248 may perform an initial classification of any detected object, to select an appropriate model for its analysis. For instance, in the case of video data 902, video analytics process 248 may determine that video data 902 depicts a person and apply a human pose estimation model to it, to extract out the set of key points 904 for each analyzed frame.

As shown in FIG. 9B, video analytics process 248 may then convert the extracted sets of key points for a detected object into a set of timeseries 910. For any given key point, its corresponding timeseries may represent its change in coordinates over time, its location relative to one or more other key points, its spatial movement over time (e.g., its velocity, its direction of motion, etc.), combinations thereof, or the like. In various implementations, video analytics process 248 may use the set of timeseries 910 as a fingerprint for the person depicted in video data 902. Indeed, the characteristics of the timeseries (e.g., their amplitudes, frequencies, shapes, patterns, etc.) will vary from one object to another enough that video analytics process 248 can treat them as representations of the object. In turn, video analytics process 248 may use this information to distinguish that person or other object from others, (re-)identifying the person or other object across different video streams, and the like.

According to various implementations, the above timeseries analysis can also be extended to groups of objects, even in a crowded area. To do so, in some implementations, video analytics process 248 may employ self-supervised learning to label different groups of objects and/or label their behaviors. For instance, video analytics process 248 could group the data based on different levels of timeseries analysis and/or different metrics.

In various implementations, video analytics process 248 may all employ object (re)identification, to track the various object(s) depicted in video data over time. For instance, a detected object may be any of the following, among others: a person, a vehicle, a package, a suitcase or other portable object, or the like. In some implementations, video analytics process 248 may also identify a collection of multiple physical objects as a singular object for purposes of tracking an analysis.

Figure 10A:
FIGS. 10A-10B illustrate examples of the analysis of different frames of a video feed.
Figure 10A:
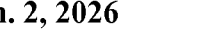
Figure 10B:

By way of example, FIGS. 10A-10B illustrate different frames 1000, 1010, respectively, of a video stream from a camera. As shown in FIG. 10A, video analytics process 248 may detect and track different people present in the physical location using a person (re)identification mechanism. Each detected person is shown in frame 1000 as highlighted. In addition, video analytics process 248 may also detect clusters of people as separate objects for analysis, each of which is shown in frame 1000 as circled.

In various implementations, video analytics process 248 may, for any or all of the identified objects in the video data, compute their spatial characteristics. For instance, video analytics process 248 may compute the centroid of a certain object, its two-dimensional or three-dimensional coordinates, its shape, its kinematics information, its relative position and/or trajectory with respect to one or more other object(s), the constituent members of a cluster object, or other information regarding the characteristics of the object.

Generally, each timeseries computed by video analytics process 248 represents the spatial characteristics of its associated object (e.g., a singular object or cluster of objects) over time. A key observation herein is that different activities/behaviors performed by the object under analysis will also be reflected in its corresponding timeseries as a distinguishable pattern. For instance, the timeseries for a person standing relatively still for a period of time in the video data will be relatively constant. Conversely, a person playing basketball may have wide variations in their timeseries, as they transition between running, stopping, dribbling the ball, shooting the ball, etc. Each timeseries pattern is referred to herein as a "behavioral regime" as it corresponds to a different activity being performed by the object.

According to various implementations, video analytics process 248 may detect events of interest in the video data based on the rate of regime changes of the object(s) under analysis. While it may be possible to simply apply anomaly detection to a timeseries to detect anomalous events, doing so could also inadvertently flag regime changes as anomalous, despite them being perfectly normal activities. For instance, as noted above, the spatial timeseries of a person running and then shooting a basketball may exhibit a regime change which might be viewed as anomalous by a traditional anomaly detector. Instead, video analytics process 248 may look to the rate of regime change of the one or more object(s), to identify events that may be of interest.

By way of example, as shown in FIG. 10A, assume that a player 1002 has suddenly collapsed on the basketball court, indicating a potential medical emergency. In such a case, the timeseries of the player exhibit a very sudden regime change, due to the player going from running to laying down. This may be of particular interest when compared to that of the other objects, as the other players may not have initially noticed the collapsed player 1002.

In addition, as shown in FIG. 10B, the spatial timeseries of the other objects will also exhibit rapid regime changes, as the other players begin to notice the collapsed player 1002. Here, the other players may go from behavioral regimes corresponding to running, dribbling, etc. to standing around the collapsed player 1002. From the perspective of the cluster objects, this also corresponds to a sudden merging of clusters of people into a singular cluster around the collapsed player 1002.

In various implementations, to analyze the rate of regime changes in the timeseries, in some implementations, video analytics process 248 may compute the derivatives of the timeseries and compare them to one or more threshold values. Thus, if the derivative of the timeseries exceeds such a threshold, this may indicate a rapid transition to a new regime, which could then be reported to a user interface as an event of interest.

Figure 11:
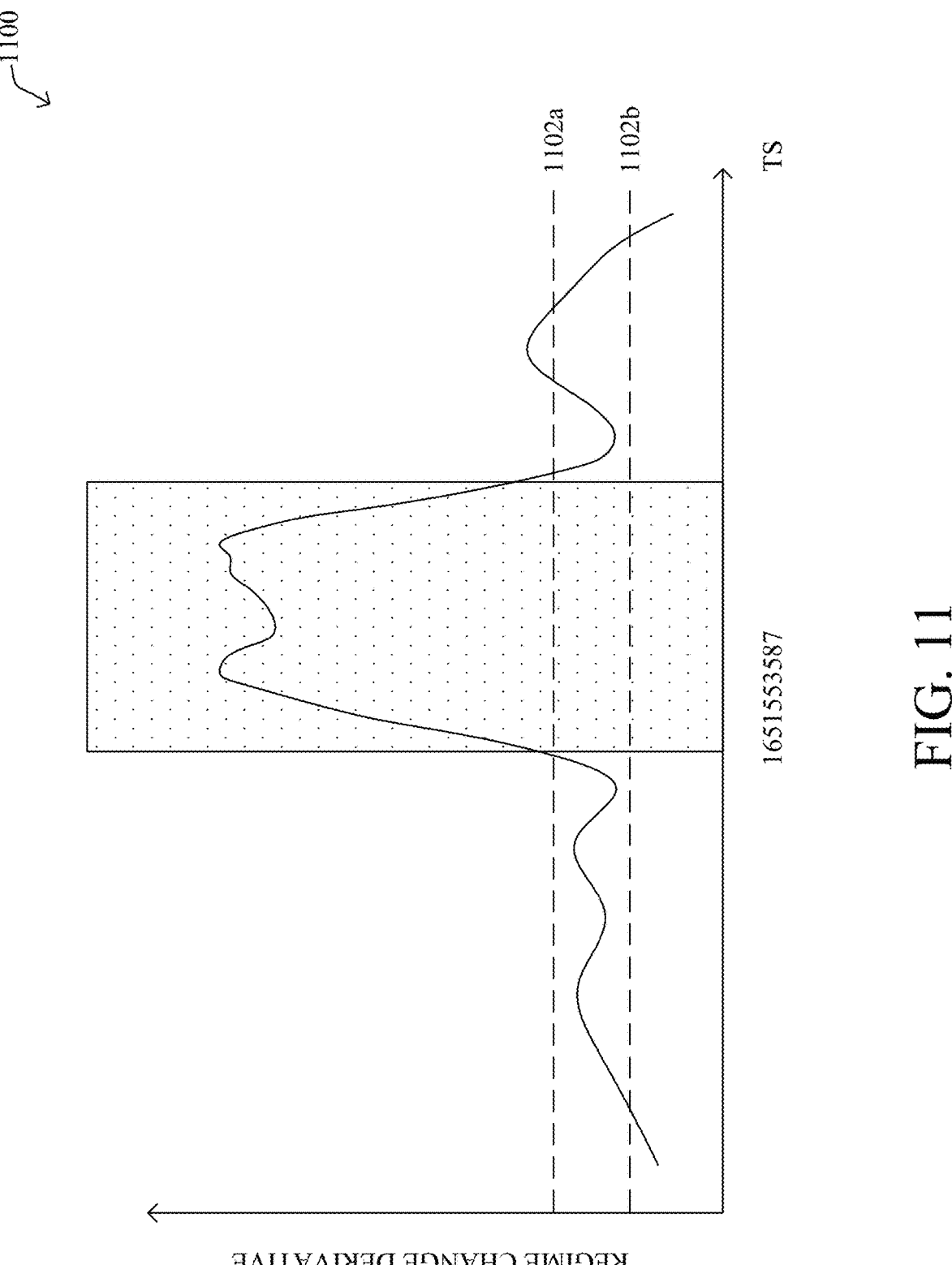
FIG. 11 illustrates an example plot of the regime change derivative for a timeseries.

For instance, FIG. 11 illustrates an example plot 1100 of the regime change derivative for a timeseries, according to various implementations. As shown, assume that there exists a baseline range between thresholds 1102a-1102b for the regime change derivative of a particular timeseries over time (e.g., a timeseries labeled with the identifier '1651553587'), such as for the player 1002 shown in FIGS. 10A-10B. In such a case, when the regime change derivative exceeds threshold 1102a, such as due to the player suddenly collapsing, video analytics process 248 may deem this an event of interest and raise an alert to a user interface for further review. Such thresholds may be set manually, based on a percentile or other distribution of values, or the like.

While the above approach is able to identify conditions within the video data that may be of interest or concern to a user of the video analytics system, such timeseries analysis is not without cost. Indeed, the (near-)real-time timeseries analysis is very computationally expensive. This could, for instance, limit the implementation of the timeseries analysis to computing devices with more resources, such as cloud servers. Thus, reducing the computational load could not only free up resources for the device performing the timeseries extraction and analysis, but also opens up the possibility of deploying the analytics to devices with fewer resources, such as networking devices at the edge of the local network or deeper into the network, as well.

According to further implementations, the timeseries analysis above can also be leveraged to train a self-supervised model to perform video analytics (e.g., classification of video). To do so, video analytics process 248 may automatically use the results of this analysis to label frames of the video data, thereby constructing a training dataset on which a self-supervised machine/deep learning model may be trained.

Figure 12:
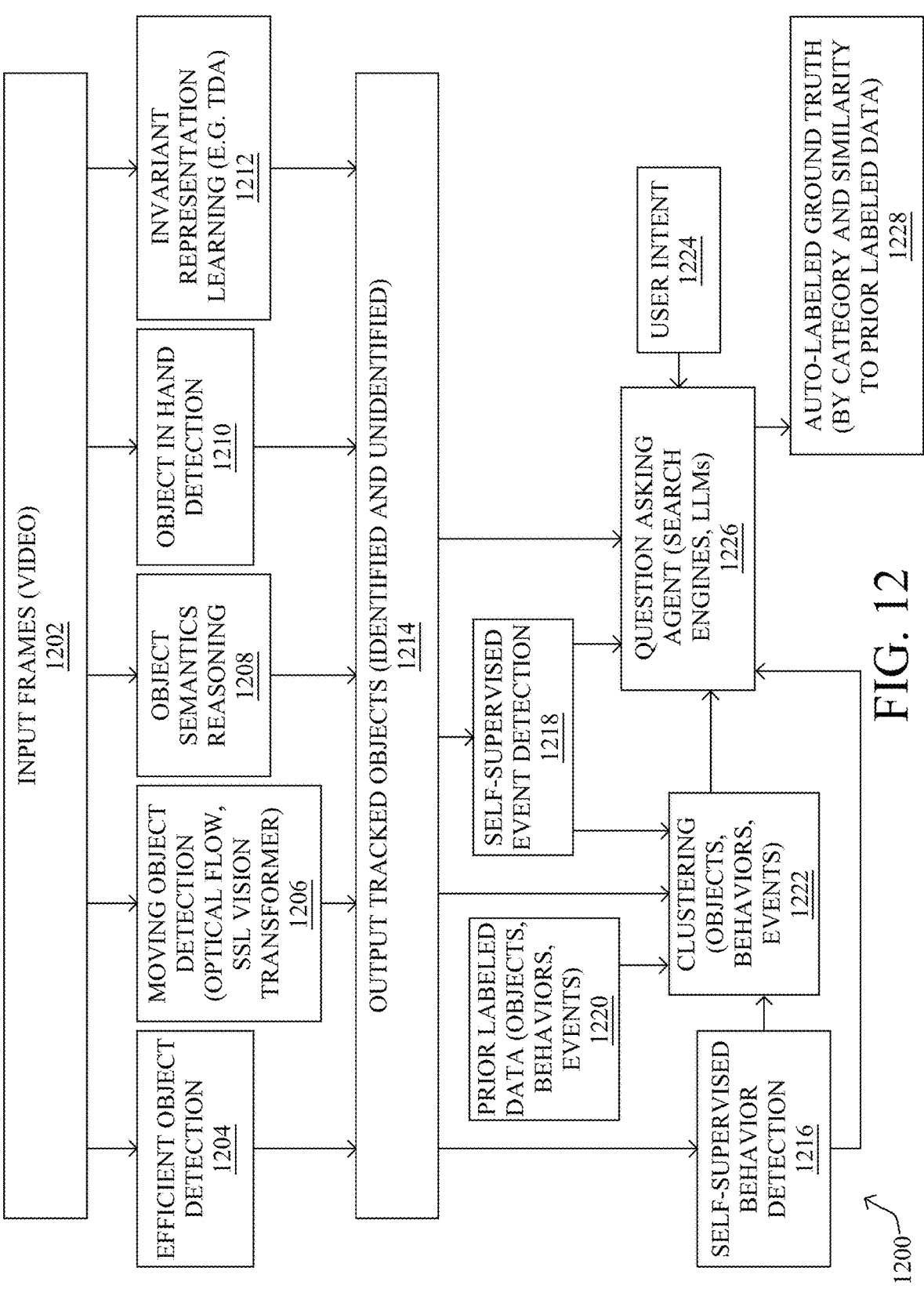
FIG. 12 illustrates an example architecture for the automatic labeling and event detection for video analytics using hybrid artificial intelligence (AI)

To this end, FIG. 12 illustrates an example architecture 1200 for the automatic labeling and event detection for video analytics using hybrid AI (e.g., to implement video analytics process 248). As will become apparent, architecture 1200 can recognize, categorize, and annotate moving objects, behaviors, and events in video sequences/clips by converting video analytics temporal information into timeseries and processing those timeseries with various semantic segmentation algorithms, such as matrix profile, and detecting regime change rates or change point rates. The technology has numerous applications, including surveillance, autonomous vehicle navigation, sports analytics, video content analysis, social science research, human-computer interaction, healthcare, animal behavior studies, entertainment, and retail.

The first step in the auto labeling process by architecture 1200 involves recognizing and tracking moving objects within video sequences. The system detects objects using deep learning-based object detection algorithms and tracks them using state-of-the-art tracking techniques. For instance, as shown, consider the case in which the system takes as input video data 1202 (e.g., a set of input frames from any number of video clips or feeds). In turn, architecture 1200 may perform any or all of the following on video data 1202, to generate a set 1214 of tracked objects from within it:

Efficient object detection 1204—to do so, architecture 1200 may leverage a one-shot object detection algorithm, such as You Only Look Once (YOLO) or other suitable algorithm.

Moving object detection 1206—architecture 1200 may also perform moving object detection using an approach such as optical flow analysis, self-supervised learning (SSL) transformer, or the like.

Object semantic reasoning 1208—architecture 1200 may further perform semantic reasoning on the video data, to help identify any depicted objects.

Object in hand detection 1210—architecture 1200 may further leverage one or more algorithms that are specifically configured to detect objects being held by people and distinguish between the hand of the person and the held object.

Invariant representation learning 1212—architecture 1200 may further use one or more invariant representation learning algorithm, such as temporal dynamic attention (TDA) or the like, to assess the input video data 1202.

Once objects are recognized and tracked, architecture 1200 may extract the high-level feature vectors and stores them in a vector database as set 1214 of tracked objects, which may include both identified and unidentified objects.

In some instances, to help further identify the objects, architecture 1200 may also perform clustering 1222 on their feature vectors, to help identify those objects whose types are currently unknown. To this end, architecture 1200 may compute a similarity metric, such as cosine similarity or Euclidean distance, to compare the feature vectors and group similar objects together. This categorization process enables the system to identify and organize objects into meaningful categories based on their appearance, motion, and interaction characteristics.

After categorizing the objects, the neurosymbolic integration module may utilize its knowledge representation and AIKR reasoners to classify and label each category. This classification process may involve recognizing specific object types, such as vehicles, pedestrians, or animals, based on the category's common appearance, motion patterns, and contextual information. Here, architecture 1200 may also leverage a small set of prior labeled data 1220, allowing it to identify certain objects based on their similarities to objects in small set of prior labeled data 1220 whose types are known.

The system continuously refines and verifies the generated object labels and categories through self-supervised learning. By incorporating feedback from the AIKR reasoners, additional context from the video data, and the similarity-based categorization, the system is also able to improve its assessments over time.

The hybrid AI based architecture 1200 may also be capable of automatically labeling behaviors in video data by performing self-supervised behavior detection 1216. By converting video analytics temporal information into time series and processing it with various semantic segmentation algorithms, such as matrix profile, and detecting regime change rates or change point rates, the system can efficiently process and label video data with minimal human intervention.

Behavioral feature extraction may involve analyzing pose estimation, body language, facial expressions, and interaction patterns between multiple entities within the video frames. The system then utilizes time series semantic segmentation and regime change detection to identify temporal patterns and boundaries between distinct behavioral activities, enabling the accurate separation and classification of individual behaviors in the video data.

Similar to the categorization of moving objects, the system extracts high-level feature vectors from the detected behaviors and stores them in a vector database. A similarity metric is employed to compare the feature vectors and group similar behaviors together. This categorization process enables the system to identify and organize behaviors into meaningful categories based on their visual, motion, and interaction characteristics.

Once the behaviors have been categorized, the neurosymbolic integration module utilizes the knowledge representation and AIKR reasoners to classify and label each category. This classification process may involve recognizing specific actions, emotional states, or social interactions based on the category's common appearance, motion patterns, and contextual information.

In some implementations, the hybrid AI based architecture 1200 may also detect events depicted in video data 1202 and perform self-supervised event detection 1218. By correlating the regime changes and regime change rates across all objects in the scene, the system can identify and label significant events that involve multiple entities, such as group activities, interactions, and environmental changes.

The system may then analyze the regime changes and regime change rates detected in the time series data of individual objects in the scene. By correlating these changes across all objects, the system can identify instances where multiple entities undergo simultaneous or related regime changes, signifying the occurrence of an event.

Event-related features, such as spatial relationships between objects, temporal synchrony of motion patterns, and environmental factors, are extracted from the video data to facilitate event detection. The system then categorizes events using similarity metrics and vector databases, grouping similar events together.

After categorizing the events, the neurosymbolic integration module utilizes the knowledge representation and AIKR reasoners to classify and label each category. This classification process may involve recognizing specific event types, such as group interactions, environmental changes, or synchronized activities, based on the category's common appearance, motion patterns, and contextual information.

The system continuously refines and verifies the generated event labels and categories through self-supervised learning, improving its labeling accuracy and adapting to new, previously unseen event situations.

Architecture 1200 may further include a question asking agent 1226 that integrates with a user interface provided by architecture 1200. Such an agent may leverage one or more search engines, large language models (LLMs) such as ChatGPT or the like, or other mechanisms to interpret the user intent 1224 from input to architecture 1200 provided by a user. For instance, a user may issue a voice-based or text-based input of "generate 100,000 samples of video clips depicting car accidents." In such a case, agent 1226 may identify the user intent 1224 from this input and, in turn, leverage its video analytics pipeline to output a set of video data/clips 1228 that have been labeled, accordingly.

In various implementations, a user may also control the operations of architecture 1200 by specifying any number of constraint parameters via its user interface. Generally, such parameters may affect how and whether architecture 1200 detects and labels a specific object, behavior, or event. For instance, architecture 1200 may receive a specification of any or all of the following constraint parameters, to control its generation of labeled video data:

Simultaneity—The simultaneity parameter controls the temporal window within which the system considers multiple regime changes or change point rates as simultaneous. By adjusting this parameter, users can define the degree of temporal proximity required for events to be considered related, allowing for more or less strict event correlation depending on the application.

Confidence—The confidence parameter determines the minimum confidence threshold that the system should have when automatically labeling events. By increasing this value, users can ensure that only events with a high degree of certainty are labeled, reducing the likelihood of false positives. Conversely, decreasing this value can allow for the inclusion of potentially ambiguous or uncertain events, increasing the system's overall sensitivity to event detection.

Sensitivity—The sensitivity parameter adjusts the system's responsiveness to subtle or minor regime changes and change point rates. A higher sensitivity setting will enable the system to detect and label events with smaller or less obvious changes in the scene, while a lower sensitivity setting will focus on more pronounced events, potentially reducing the noise and false detections.

Minimum Event Duration—The minimum event duration parameter defines the shortest duration an event must have to be considered valid. This parameter can be used to filter out transient or short-lived occurrences that may not be of interest or relevance to the specific application.

Maximum Event Duration—The maximum event duration parameter sets an upper limit on the duration of events that the system should detect and label. By adjusting this value, users can focus on events within a specific duration range, filtering out excessively long events that may not be relevant or could indicate a false detection.

Spatial Proximity Threshold—The spatial proximity threshold parameter controls the degree of spatial closeness required for objects involved in an event. By adjusting this value, users can define the level of spatial interaction necessary for objects to be considered part of the same event, allowing for more or less stringent spatial correlation depending on the use case.

Moving Object Association Threshold—The moving object association threshold parameter controls the degree of association required between a moving object and a series of events for them to be considered related. This parameter takes into account both the spatial proximity and temporal persistence of the moving object in relation to the events. By adjusting this value, users can define the level of interaction necessary for a moving object to be considered part of or connected to an event sequence, allowing for more or less stringent association criteria depending on the use case. This parameter can be particularly useful in scenarios where a moving object, such as a person or a vehicle, plays a significant role in the occurrence or progression of events, and understanding this relationship is essential for accurate event detection and analysis.

By providing these adjustable parameters in the user interface, the event automatic labeling system can be tailored to a wide variety of applications and requirements, ensuring optimal performance and accurate detection for diverse scenarios.

Figure 13:
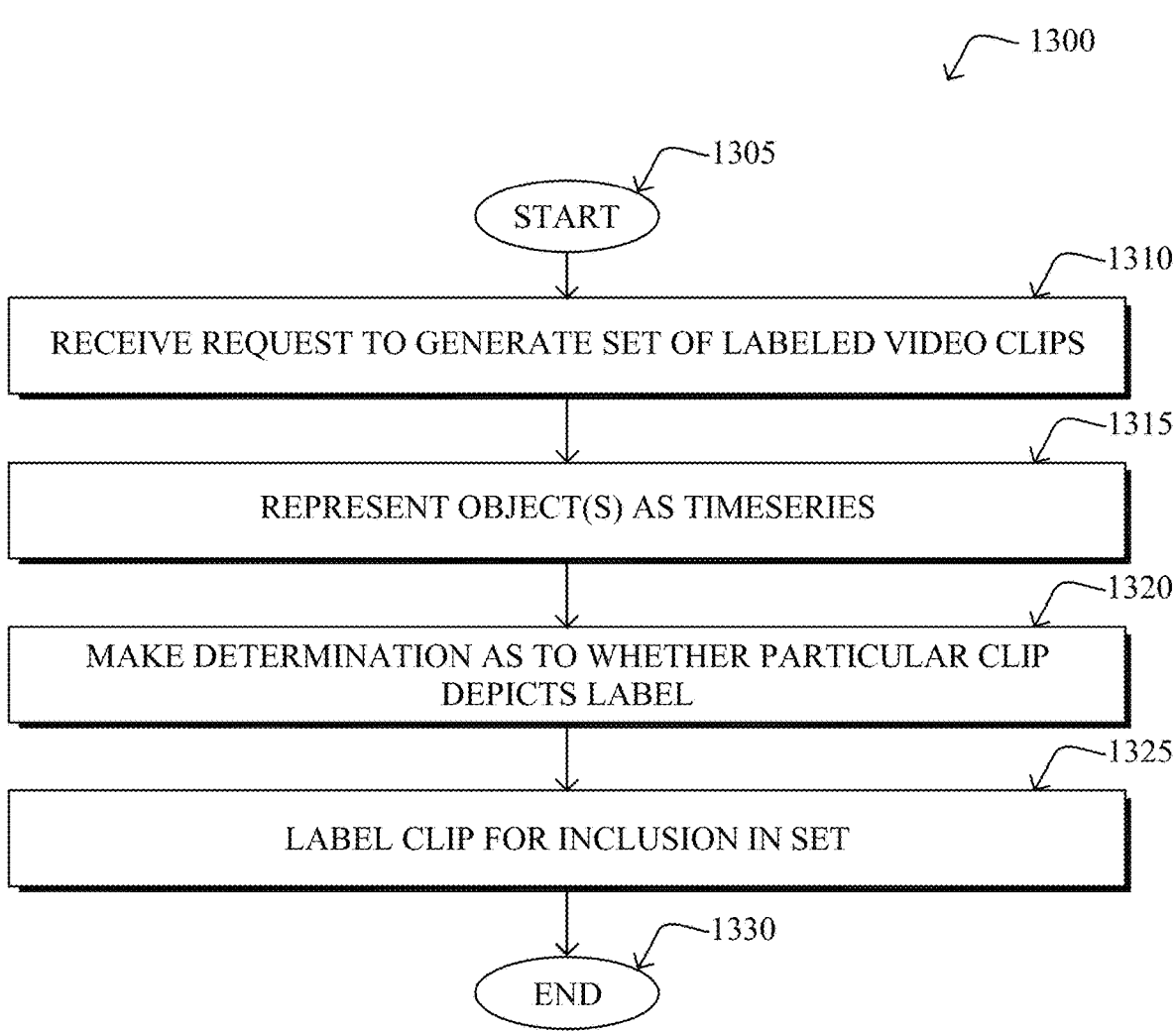
FIG. 13 illustrates an example simplified procedure for the automatic labeling and event detection for video analytics using hybrid AI.

FIG. 13 illustrates an example simplified procedure 1300 (e.g., a method) for the automatic labeling and event detection for video analytics using hybrid AI, in accordance with one or more implementations described herein. For example, a non-generic, specifically configured device (e.g., device 200) may perform procedure 1300 by executing stored instructions (e.g., video analytics process 248). The procedure 1300 may start at step 1305, and continues to step 1310, where, as described in greater detail above, the device may receive a request to generate a set of video clips that depict a specified classification label. In some instances, the specified classification label corresponds to a behavior of one or more depicted objects. In further instances, the specified classification label corresponds to a particular type of event involving one or more depicted objects. In some implementations, the device processes the request using a large language model (LLM).

At step 1315, as detailed above, the device may represent each of one or more objects depicted in a particular video clip over time as a set of timeseries of key points associated with that object.

At step 1320, the device may make a determination as to whether the particular video clip depicts the specified classification label by analyzing the set of timeseries of key points associated with the particular video clip and in accordance with one or more constraint parameters, as described in greater detail above. In various implementations, the device may do so by assessing one or more regime changes or change point rates associated with the set of timeseries. In some implementations, the one or more constraint parameters specify a minimum or maximum time duration constraint for the particular type of event. In further implementations, the one or more constraint parameters specify a time window during which multiple regime changes or change points associated with the set of timeseries to be part of a singular event of the particular type of event. In another implementations, the one or more constraint parameters specify a spatial proximity threshold within which depicted objects as considered to be involved in a singular event. In a further implementation, the one or more constraint parameters specify a degree of sensitivity to a regime change or change point. In some implementations, the one or more constraint parameters control a degree of association between moving objects before they are considered to be involved in a singular event.

At step 1325, as detailed above, the device may label, based on the determination, the particular video clip with the specified classification label for inclusion in the set of video clips that depict the specified classification label. In various implementations, the device may use the set of video clips that depict the specified classification label to train a machine learning-based classifier to determine whether an input video clip depicts the specified classification label.

Procedure 1300 then ends at step 1330.

It should be noted that while certain steps within procedure 1300 may be optional as described above, the steps shown in FIG. 13 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for the automatic labeling and event detection for video analytics using hybrid AI, it is to be understood that various other adaptations and modifications may be made within the spirit and scope of the implementations herein. For example, while certain implementations are described herein with respect to specific use cases for the techniques herein, the techniques can be extended without undue experimentation to other use cases, as well.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof, that cause a device to perform the techniques herein. Accordingly, this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method comprising:

receiving, at a device, a request that specifies a classification label to generate a set of video clips that depict the specified classification label;

representing, by a device, each of one or more objects depicted in a particular video clip over time as a set of timeseries of key points associated with that object;

making, by the device, a determination as to whether the particular video clip depicts the specified classification label by analyzing the set of timeseries of key points associated with the particular video clip and in accordance with one or more constraint parameters; and labeling, by the device and based on the determination, the particular video clip with the specified classification label for inclusion in the set of video clips that depict the specified classification label.

2. The method as in claim 1, further comprising:

using the set of video clips that depict the specified classification label to train a machine learning-based classifier to determine whether an input video clip depicts the specified classification label.

3. The method as in claim 1, wherein the specified classification label corresponds to a behavior of one or more depicted objects.

4. The method as in claim 1, wherein the specified classification label corresponds to a particular type of event involving one or more depicted objects, and wherein the device makes the determination by:

assessing one or more regime changes or change point rates associated with the set of timeseries.

5. The method as in claim 4, wherein the one or more constraint parameters specify a minimum or maximum time duration constraint for the particular type of event.

6. The method as in claim 4, wherein the one or more constraint parameters specify a time window during which multiple regime changes or change points associated with the set of timeseries to be part of a singular event of the particular type of event.

7. The method as in claim 4, wherein the one or more constraint parameters specify a spatial proximity threshold within which depicted objects as considered to be involved in a singular event.

8. The method as in claim 4, wherein the one or more constraint parameters specify a degree of sensitivity to a regime change or change point.

9. The method as in claim 4, wherein the one or more constraint parameters control a degree of association between moving objects before they are considered to be involved in a singular event.

10. The method as in claim 1, wherein the device processes the request using a large language model (LLM).

11. An apparatus, comprising:

a network interface to communicate with a computer network;

a processor coupled to the network interface and configured to execute one or more processes; and a memory configured to store a process that is executed by the processor, the process when executed configured to:

receive a request that specifies a classification label to generate a set of video clips that depict the specified classification label;

represent each of one or more objects depicted in a particular video clip over time as a set of timeseries of key points associated with that object;

make a determination as to whether the particular video clip depicts the specified classification label by analyzing the set of timeseries of key points associated with the particular video clip and in accordance with one or more constraint parameters; and label, based on the determination, the particular video clip with the specified classification label for inclusion in the set of video clips that depict the specified classification label.

12. The apparatus as in claim 11, wherein the process when executed is further configured to:

use the set of video clips that depict the specified classification label to train a machine learning-based classifier to determine whether an input video clip depicts the specified classification label.

13. The apparatus as in claim 11, wherein the specified classification label corresponds to a behavior of one or more depicted objects.

14. The apparatus as in claim 11, wherein the specified classification label corresponds to a particular type of event involving one or more depicted objects, and wherein the apparatus makes the determination by:

assessing one or more regime changes or change point rates associated with the set of timeseries.

15. The apparatus as in claim 14, wherein the one or more constraint parameters specify a minimum or maximum time duration constraint for the particular type of event.

16. The apparatus as in claim 14, wherein the one or more constraint parameters specify a time window during which multiple regime changes or change points associated with the set of timeseries to be part of a singular event of the particular type of event.

17. The apparatus as in claim 14, wherein the one or more constraint parameters specify a spatial proximity threshold within which depicted objects as considered to be involved in a singular event.

18. The apparatus as in claim 14, wherein the one or more constraint parameters specify a degree of sensitivity to a regime change or change point.

19. The apparatus as in claim 14, wherein the one or more constraint parameters control a degree of association between moving objects before they are considered to be involved in a singular event.

20. A tangible, non-transitory, computer-readable medium storing program instructions that cause a device to execute a process comprising:

receiving, at the device, a request that specifies a classification label to generate a set of video clips that depict the specified classification label;

representing, by a device, each of one or more objects depicted in a particular video clip over time as a set of timeseries of key points associated with that object;

making, by the device, a determination as to whether the particular video clip depicts the specified classification label by analyzing the set of timeseries of key points associated with the particular video clip and in accordance with one or more constraint parameters; and labeling, by the device and based on the determination, the particular video clip with the specified classification label for inclusion in the set of video clips that depict the specified classification label.

\* \* \* \* \*